United States Patent
Brogårdh

[19]

[11] Patent Number: 6,095,011
[45] Date of Patent: Aug. 1, 2000

[54] DEVICE FOR RELATIVE MOVEMENT OF TWO ELEMENTS

[75] Inventor: Torgny Brogårdh, Västerås, Sweden

[73] Assignee: ABB AB, Vasteras, Sweden

[21] Appl. No.: 09/142,582

[22] PCT Filed: Mar. 14, 1997

[86] PCT No.: PCT/SE97/00433

§ 371 Date: Nov. 30, 1998

§ 102(e) Date: Nov. 30, 1998

[87] PCT Pub. No.: WO97/33725

PCT Pub. Date: Sep. 18, 1997

[30] Foreign Application Priority Data

Mar. 14, 1996 [SE] Sweden .................................. 9600998

[51] Int. Cl.[7] ............................................. B25J 18/00
[52] U.S. Cl. ................................ 74/490.03; 248/278.1; 248/284.1; 414/917; 901/23
[58] Field of Search ................ 74/490.03; 248/284.1; 248/278.1; 414/917; 901/23

[56] References Cited

U.S. PATENT DOCUMENTS

| | | | |
|---|---|---|---|
| 4,329,110 | 5/1982 | Schmid | 414/730 |
| 4,329,111 | 5/1982 | Schmid | 414/733 |
| 4,341,502 | 7/1982 | Makino | 414/744 |
| 4,583,907 | 4/1986 | Wimberley | 414/718 |
| 4,756,655 | 7/1988 | Jameson | 414/2 |
| 4,976,582 | 12/1990 | Clavel | 414/729 |
| 5,049,029 | 9/1991 | Mitsui et al. | 414/744.5 |
| 5,237,887 | 8/1993 | Appleberry | 74/479 |
| 5,386,741 | 2/1995 | Rennex | 74/490.05 |
| 5,419,674 | 5/1995 | Chang | 414/751 |
| 5,733,092 | 3/1998 | Barry | 414/337 |

FOREIGN PATENT DOCUMENTS

| | | |
|---|---|---|
| 2 572 981 | of 1986 | France . |
| 1602 732 | of 1990 | U.S.S.R. . |
| 2 060 566 | of 1981 | United Kingdom . |

*Primary Examiner*—Allan D. Herrmann
*Attorney, Agent, or Firm*—Pollock, Vande Sande & Amernick

[57] ABSTRACT

A device for relative movement of two elements comprises at least two first links, which are connected relative to a first of the elements via hinges and which are pivotable in substantially parallel planes relative to the first element under influence of at least one first power-exerting member. At least two second links, which are connected relative to a second of the elements via hinges, are pivotable in substantially parallel planes relative to the second element under influence of at least one second power-exerting member. The two first links form a first four-hinges system. The two second links form a second four-hinges system. These two four-hinges systems are coupled in series to each other between the first and second elements.

50 Claims, 22 Drawing Sheets

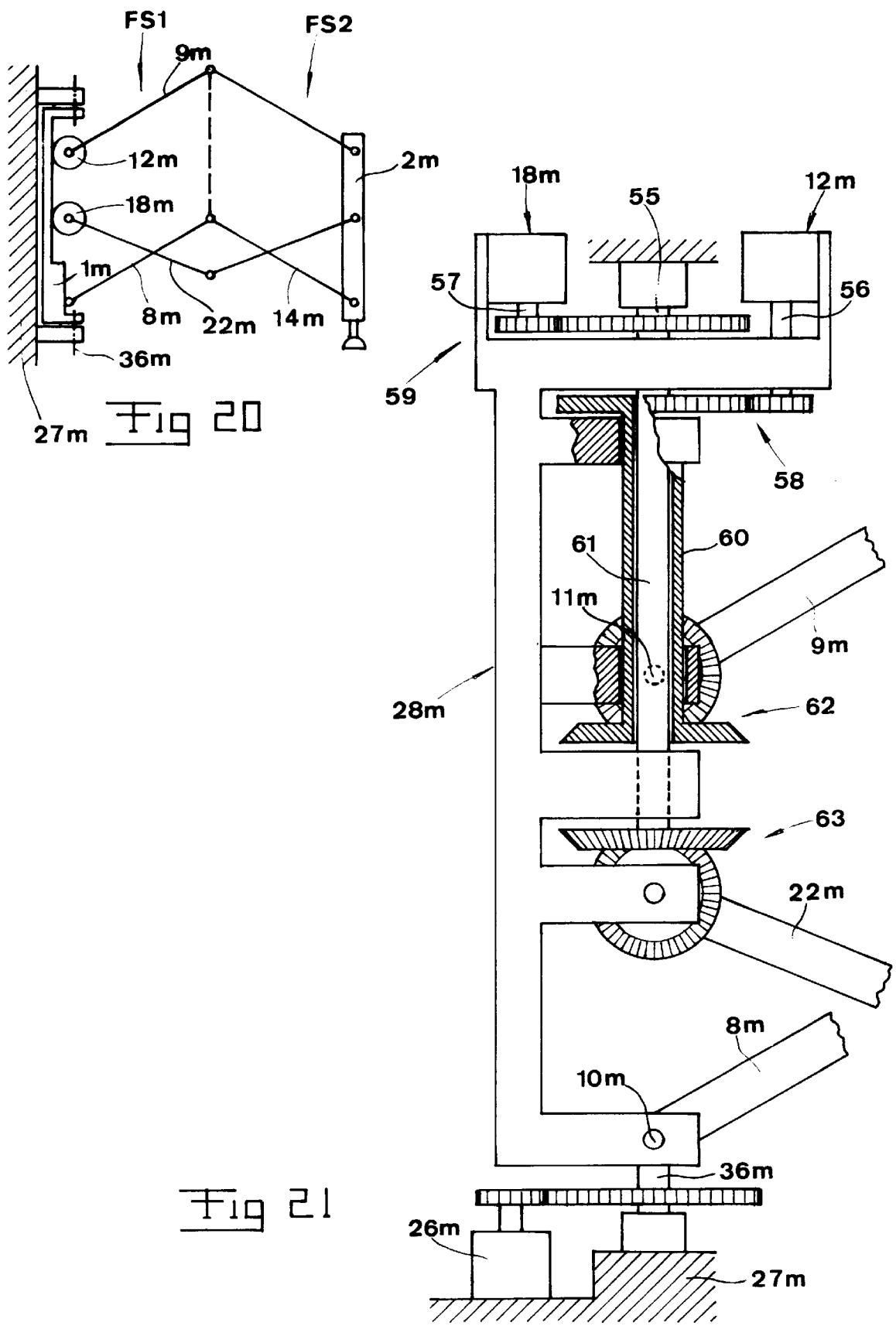

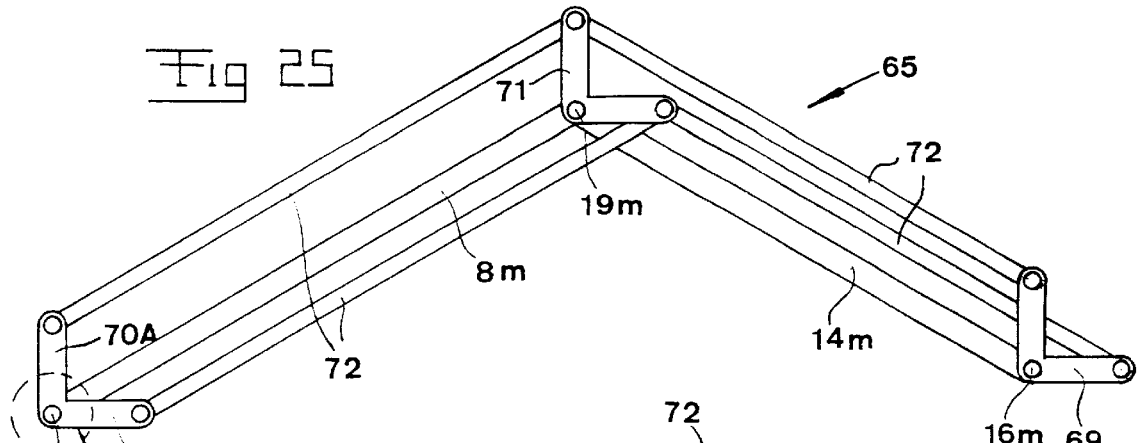
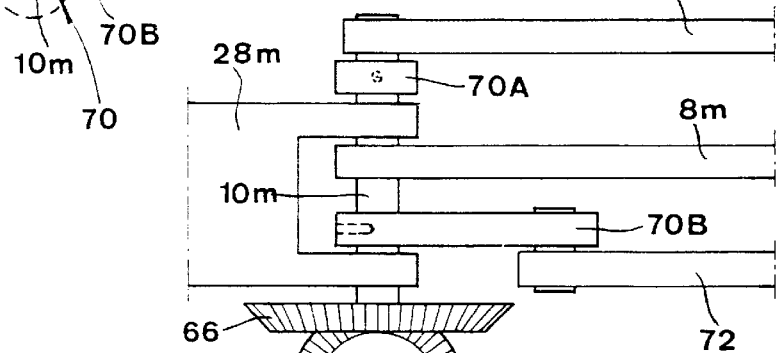
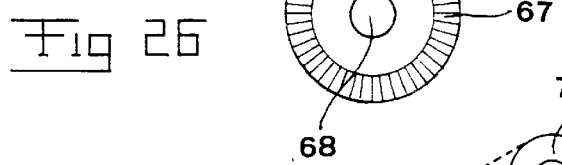
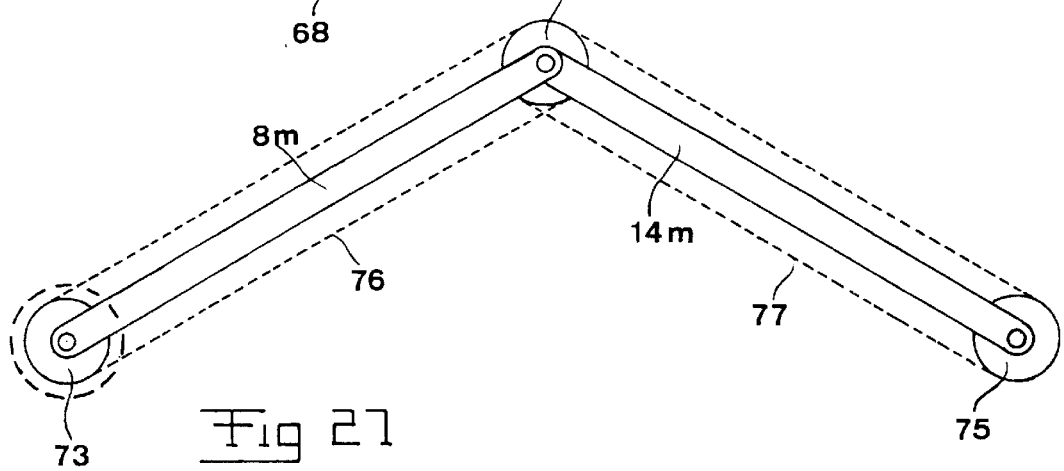
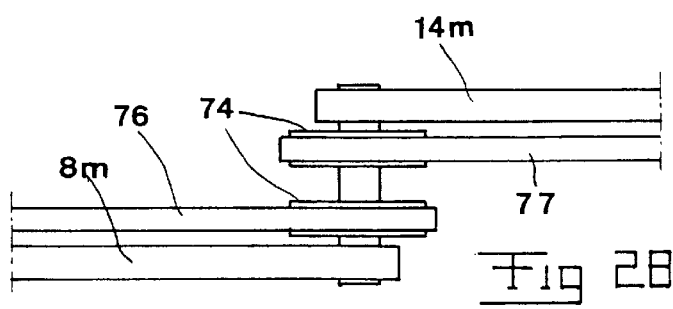

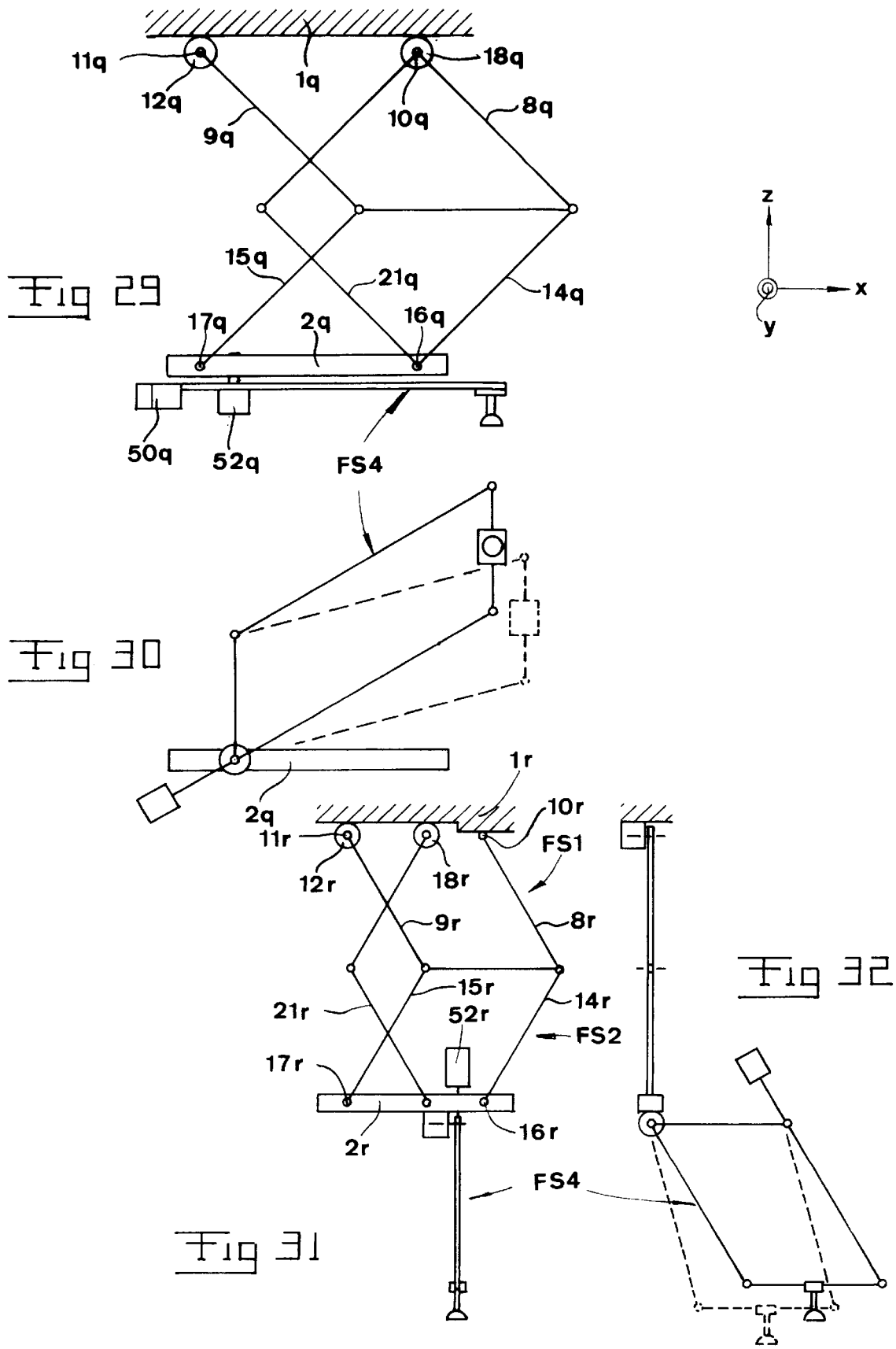

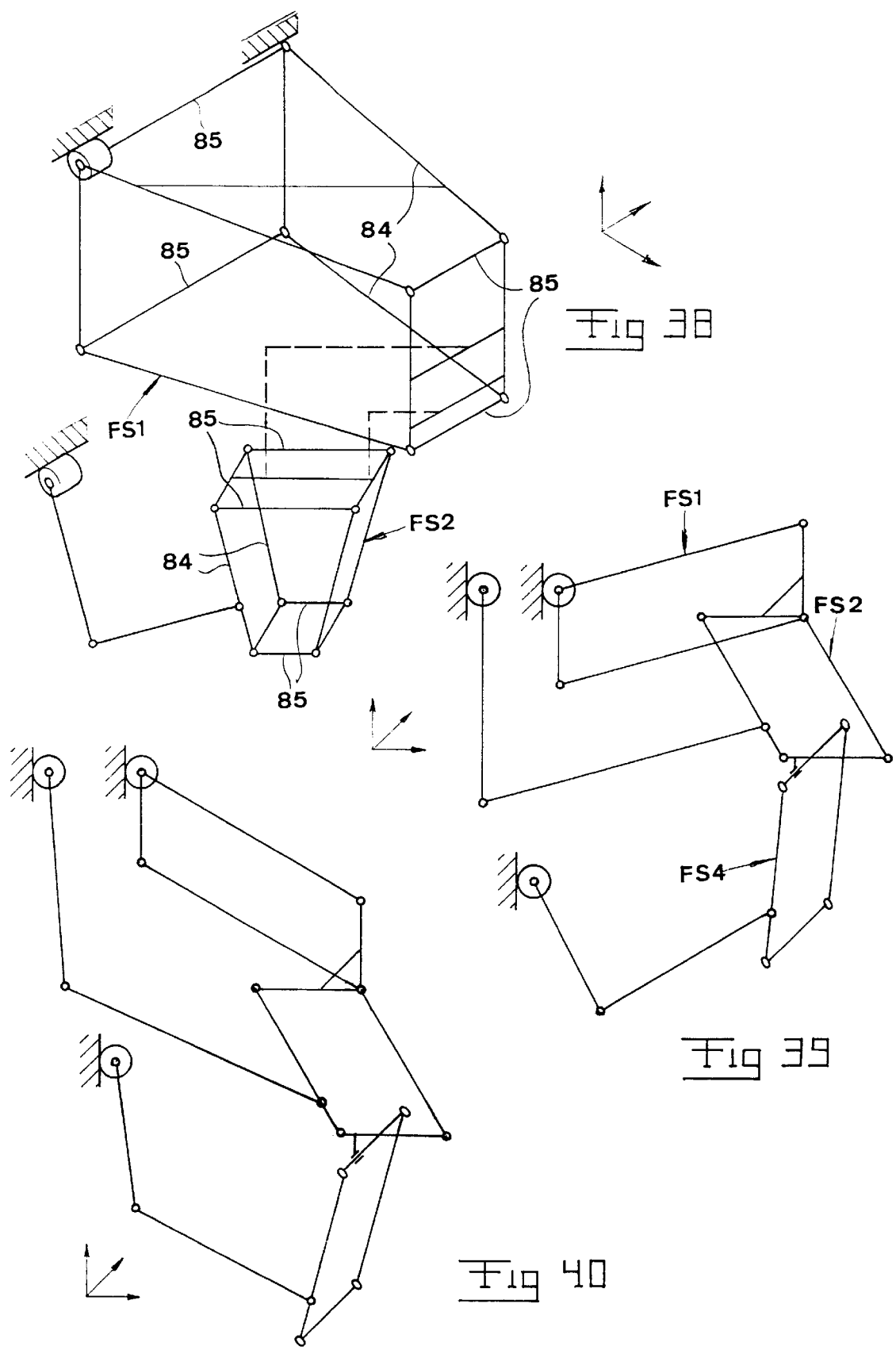

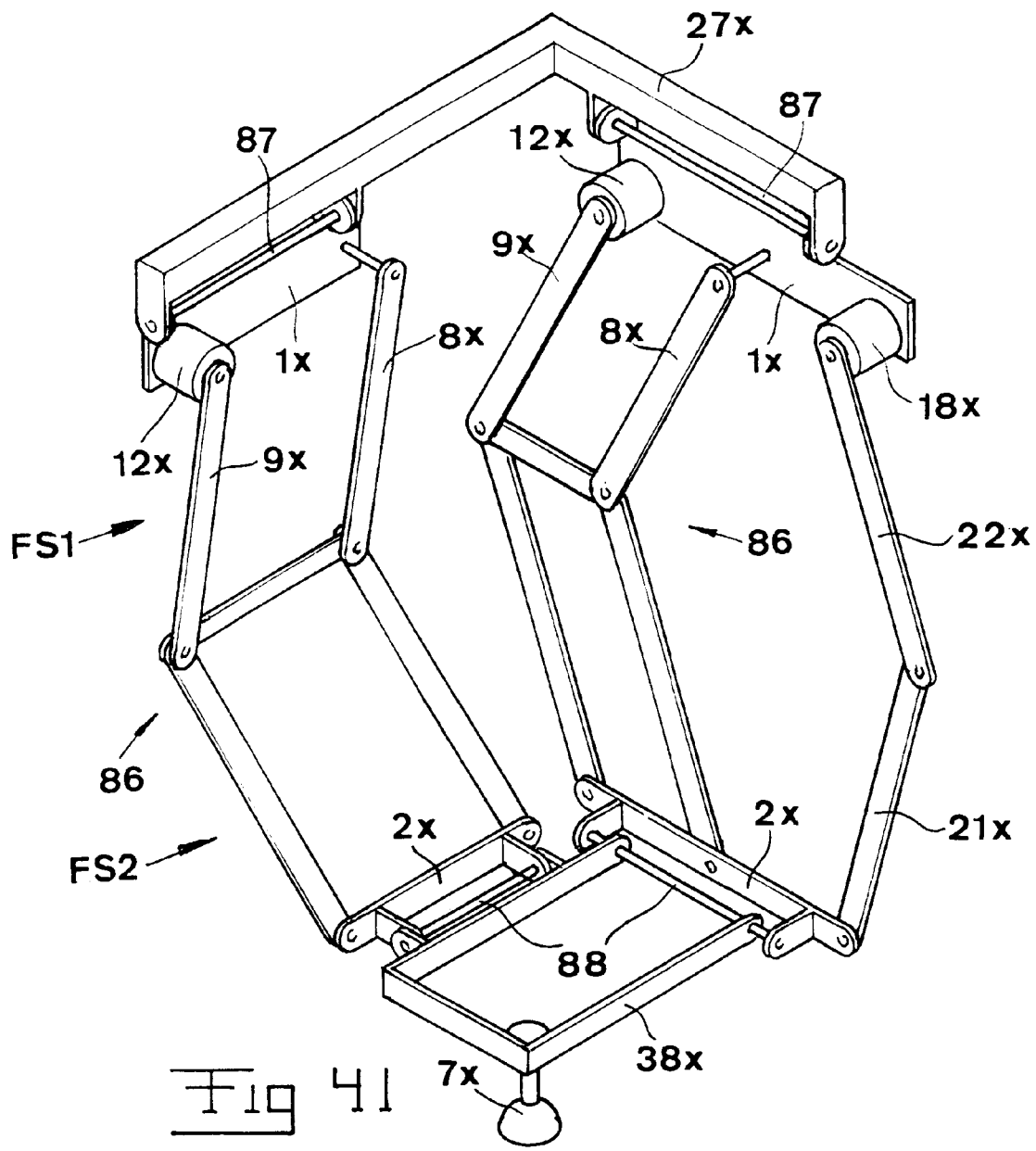

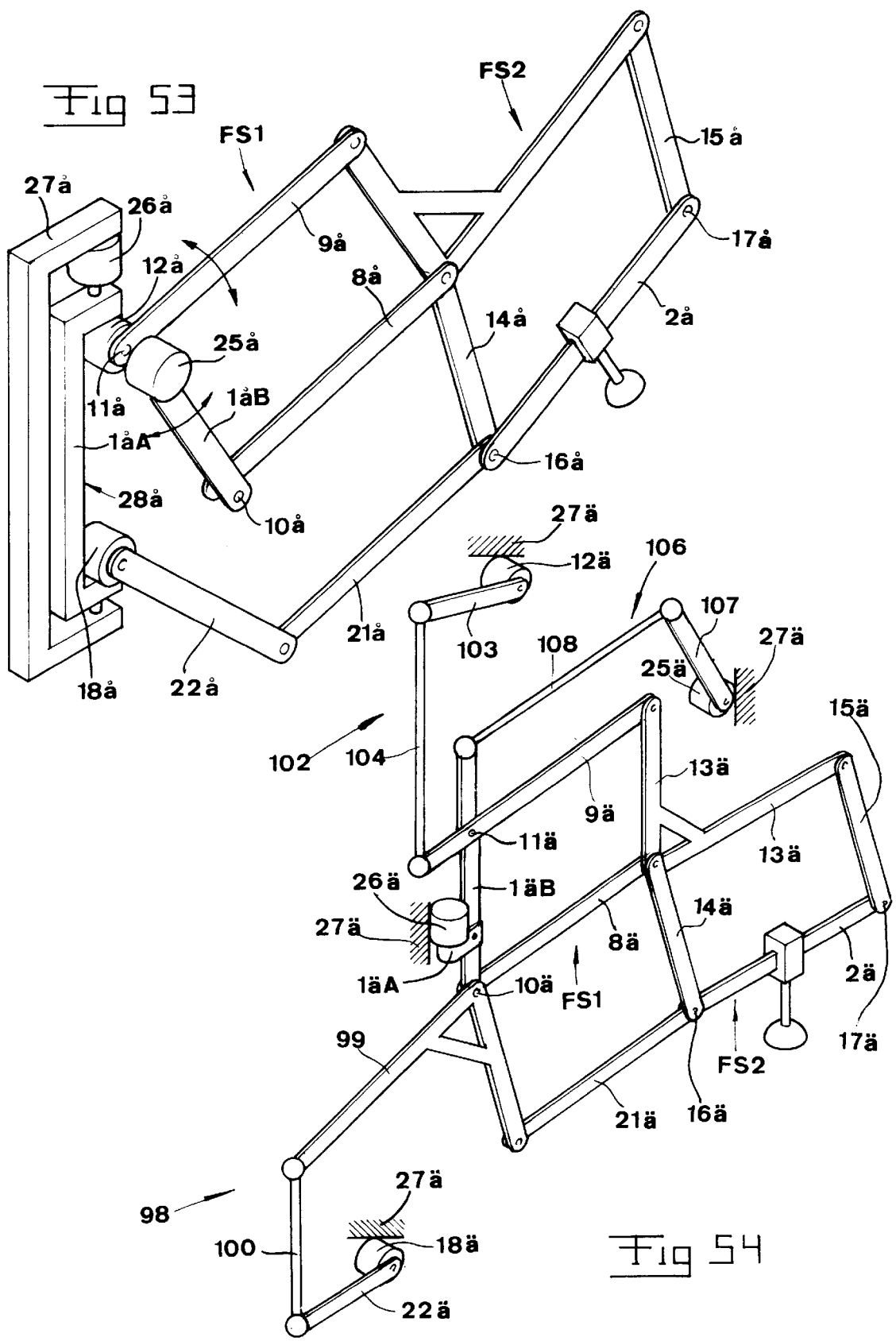

DEVICE FOR RELATIVE MOVEMENT OF TWO ELEMENTS

FIELD OF THE INVENTION

This invention is related to a device for relative movement of two elements, the device comprising articulated links interconnecting the elements and at least two power-exerting members for exerting power for the relative movement of the elements.

The relative movement of the two elements has the purpose to position them mutually in an aimed manner by means of the power-exerting members. More specifically, the device according to the invention is intended to form a manipulator or robot. The second of the elements is intended to carry, directly or indirectly via a carrying arrangement, a working member to carry out the function intended, e.g. picking/placing, packing and palletizing. However, it should be noted that the working member may be designed to execute also other working operations than those just mentioned.

Conventional robots are based upon an arm-like system of pivotable links, which at their extreme ends comprise power-exerting members for pivoting/rotating links/working members located further out on the arm. The provision of power-exerting members at the extreme end of pivot arms involves high loads and inertia, which impose restrictions with respect to possible accelerations and speeds and accuracy with respect to path. Other robot types are known but have turned out to be less successful, either by deficient performance with regard to accuracy and speed or a high cost. In the U.S. Pat. No. 4,976,582 there is described, for example, a robot, where three power-exerting members are arranged on a first element in triangular distribution. These members are connected to a movable element via three link devices coupled in parallel, likewise in triangular distribution, the link devices being hingedly connected to the associated pivot arm and to the movable element respectively by means of articulation joints providing two and not more than two degrees of freedom. In reality, each of the link devices comprises two parallel links coupled to a respective pivot arm and the movable element in a hinged manner while forming parallelograms. A disadvantage of this known type of robot is that it is difficult, as a consequence of the three-dimensional arm system, to place them closely adjacent together. Even if the known robot may be made very fast and accurate for common purposes, it is less suitable for special adaptation for specific work tasks. For instance, it is sometimes required to achieve very rapid movements in two dimensions perpendicular to each other, whereas the requirements with regard to performance as far as other degrees of freedom are concerned may be modest. The known robot may not be adjusted to such circumstances. By its symmetrical structure, the known robot also becomes relatively restricted as far as work area adaptation is concerned.

SUMMARY OF THE INVENTION

This invention aims at devising routes to provide motion devices which may be realized by means of relatively simple structural solutions but which nevertheless make it possible to achieve very rapid and precise movements in at least two directions perpendicular to each other.

A secondary purpose of the invention is to provide a modularized structure in the sense that the device should be easily adaptable to work tasks with different degree of complication.

A tertiary object of the invention is to enable use of comparatively simple and well tried hinge constructions in the device.

The primary object of the invention is achieved in that the device according to the invention comprises at least two first links connected relative to a first of the elements via hinges, the links being pivotable in substantially parallel planes relative to the first element under influence of at least one first of the power-exerting members. At least two second links are connected relative to a second of the elements via hinges and are pivotable in substantially parallel planes relative to the second element under influence of at least a second of the power-exerting members. The at least two first links form a first four-hinges system, the at least two second links form a second four-hinges system and these two four-hinges systems are coupled in series to each other between the first and second elements.

In this way a double four-hinges structure is achieved with very rapid movement performance in the plane of pivoting of the four-hinges systems.

In a preferred embodiment of the invention, the four-hinges systems form parallelograms, which means that a constant orientation of a work member carried directly or indirectly by the second element may be achieved with only two axes.

The secondary object above is according to the invention achieved in that it provides, in its form with the two four-hinges systems, freedom of movement in two substantially perpendicular directions and then may be completed with further freedoms of movement according to circumstances.

The use of four-hinges systems of the defined kind results in simple hinges which only have to provide a single degree of freedom, i.e. pure pivoting.

The solution according to the invention makes it possible to achieve a larger working area in two dimensions perpendicular to each other than it is possible to achieve with the robot according to U.S. Pat. No. 4 976 582.

A plurality of preferable developments of the invention are described below. These developments and advantages in connection with the invention are dealt with more closely in the following description.

BRIEF DESCRIPTION OF THE DRAWINGS

With reference to the enclosed drawings a more specific description of embodiment examples of the invention follows hereunder.

In the drawings;

FIG. 20 is a schematic view from the side of a robot embodiment;

FIG. 21 is a partial detailed view illustrating the more specific embodiment of the robot according to FIG. 20;

FIG. 25 is a side view of a transmission for a robot, for instance according to FIGS. 20 and 21;

FIG. 26 is a detailed view in an enlarged scale and in a position rotated 90° relative to FIG. 25;

FIG. 27 is a view similar to FIG. 25 of an alternative transmission;

FIG. 28 is a detailed view of the transmission according to FIG. 27;

FIG. 29 is a side view of an alternative robot embodiment;

FIG. 30 is a view from below of the embodiment according to FIG. 29;

FIG. 31 is a side view of a further robot embodiment;

FIG. 32 is a view of the robot according to FIG. 31 viewed from the right;

FIG. 38 is a diagrammatical perspective view of an alternative robot embodiment;

FIG. 39 is a side view of a further alternative;

FIG. 40 is a view of the embodiment according to FIG. 39 in a changed position;

FIG. 41 is perspective view of an alternative robot embodiment;

FIG. 53 is a view of a modified embodiment similar to the one in FIG. 23;

FIG. 54 is a view of a modified embodiment similar to the one in FIG. 24; and

DETAILED DESCRIPTION OF A PREFERRED EMBODIMENT

Figure 1:
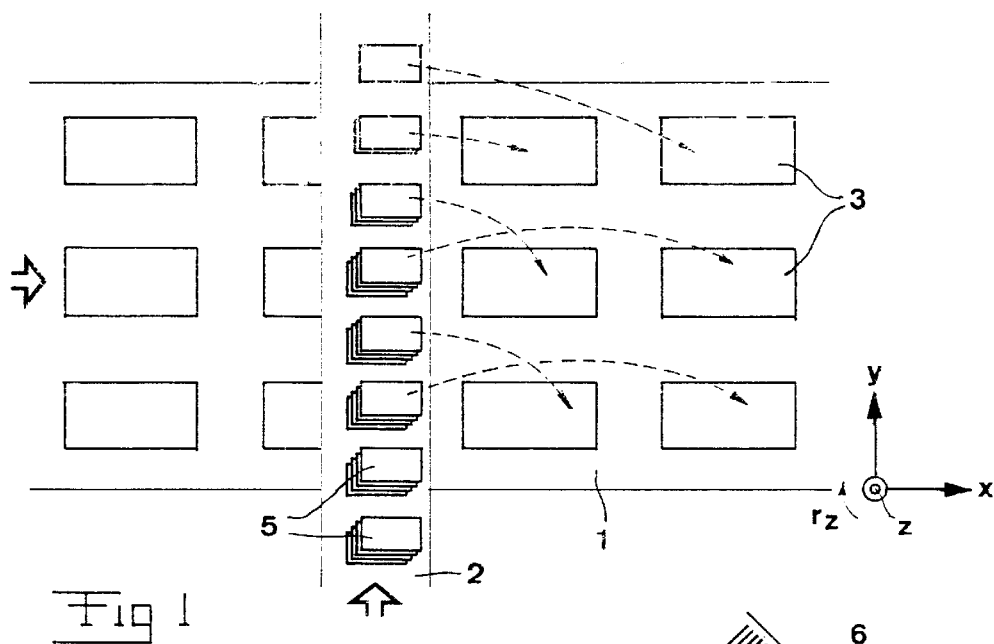
FIG. 1 is a plan view illustrating a work task for the robot according to the invention.

In order to simplify the understanding, the same reference characters with addition of letters specific to the embodiments have been used in the following with respect to different embodiments for similar or corresponding components. For example, reference characters 12, 12a, 12b, etc. all refer to a first power exerting member in different embodiments of the invention.

In FIG. 1 two perpendicularly moving conveyors 1 and 2 respectively are illustrated in order to exemplify a possible work task for the robot structure according to the invention. Components 3 are moved on the conveyor 1 whereas components 5 are moved on the transversely moving conveyor 2. As indicated with the dashed arrows in FIG. 1, the components 5 are intended to be placed upon the components 3. The conveyor 2 extends above the conveyor 1.

Thus, the conveyor 1 moves in the direction X whereas the conveyor 2 moves in the direction Y. It is understandable that high performance is required in X- and Z-direction in the illustrated case, whereas the requirements with regard to performance in Y-direction are modest.

Figure 2:
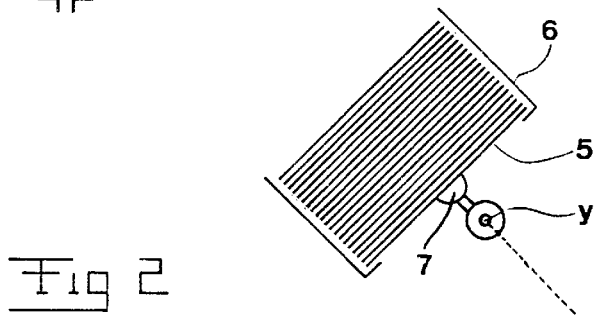
FIG. 2 is a more detailed side view.

In FIG. 2 it is illustrated that the components 3 on the conveyor 1 could be containers, on which components 5 are to be placed. This component 5 is in the example conceived to have the character of a lid or other restriction to be placed on top, e.g. foil sheets to placed on e.g. food packings, a lid being placed thereon afterwards. These foil sheets 5 are supplied by means of a magazine 6, from which the foil sheets may be fetched obliquely from below. For this purpose a work member 7 of the robot should be capable of extending obliquely upwardly so as to engage the sheet. Then the working member 7 should be rotatable about the Y-axis. In order to correct possible misalignments between the components 3 and 5, the working member 7 may also have to be rotated about the Z-axis ($r_z$ in FIG. 1).

Figure 3:
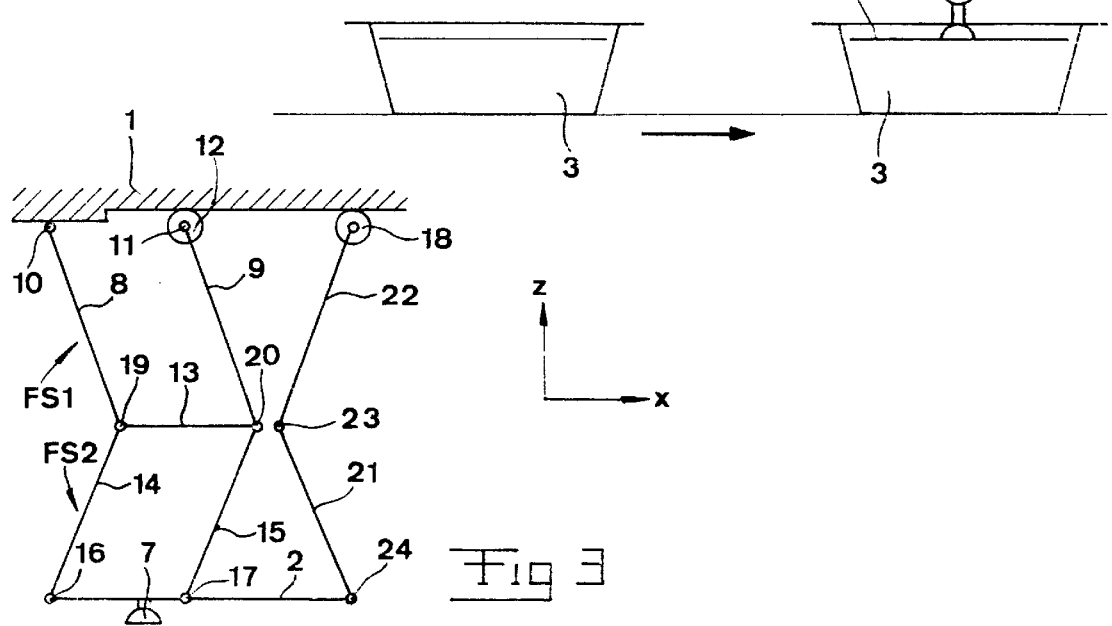
FIG. 3 is a diagrammatical side view illustrating the device according to the invention in a simple form.

The device according to the invention is illustrated in a highly basic character in FIG. 3. The device comprises a diagrammatically indicated first element 1 and a second element 2 carrying the working member 7. In the case described with reference to FIG. 2, the working member 7 may include a suction gripping means to grip the foil sheets 5 but vastly different designs of the working member are possible, e.g. tools for tasks such as welding, cutting, water cutting, glueing, burr-removing, grinding etc.

The device according to FIG. 3 comprises two first links 8, 9, which via hinges 10, 11 are connected to the first element 1. The links 8, 9 are pivotable in substantially parallel planes relative to the element 1 under influence of a first power-exerting member 12.

The device comprises two second links 14, 15, which are connected to the element 2 via hinges 16, 17. The links 14, 15 are pivotable in substantially parallel planes relative to the element 2 under influence of a second 18 of the power-exerting members.

The two links 8, 9 form a first four-hinges system FS1 whereas the second links 14, 15 form a second four-hinges system FS2. The two four-hinges systems are coupled in series with each other between the first and second elements 1, 2.

The expression "coupled in series" means here that the four-hinges system FS2 is carried by the four-hinges system FS1 spaced from the hinges 10, 11 thereof such that the four-hinges system FS2 will be movable by means of the four-hinges system FS1.

In the example the first two links 8, 9 and the two second links 14, 15 are pairwise hingedly connected directly to each other via hinges 19, 20.

At least a third link 13 connects the links 8, 9 and 14, 15 respectively. More specifically, the link 13 is hingedly connected to the links via the hinges 19, 20. Thus, the link 13 is common to the four-hinges systems FS1 and FS2. This means that the first links 8, 9, the third link 13 and the element 1 form a first articulated four-links system. The second links 14, 15, the link 13 and the element 2 form a second articulated four-links system. Hereinafter, the designations FS1 and FS2 will used for the expressions four-hinges system and four-links system. As will be described more closely with assistance of FIG. 7, the expression four-hinges system comprises, however, that it may lack a link included in a four-links system.

The four-hinges systems FS1 and FS2 form parallelograms, which means that constancy with regard to the mutual orientation of the elements 1 and 2 will be maintained independently of the positions of pivoting of the links 8, 9 and 14, 15.

The hinges 10, 11, 19, 20 in the first four-hinges system FS1 form mutually substantially parallel hinge axes. Likewise, the hinges 16, 17 and 19, 20 in the second four-hinges system FS2 form mutually substantially parallel hinge axes. The hinges are simple pivot hinges having a single degree of freedom. The hinge axes in the two four-hinges systems FS1 and FS2 are substantially parallel to each other in FIG. 3.

The first power-exerting member 12 comprises a stationary portion connected relative to the first element 1 and a movable portion connected to one of the first links, namely the one denoted 9, the movable portion being arranged to cause the link 9 to pivot relative to element 1. The member 12 may in practice have widely different constitutions. For example, it could consist of a member having a variable length and acting between points on the element 1 and link 9 in order to generate a torque about hinge 11. Another possible and in this case preferred embodiment is designing the member 12 as a rotary means having a stator and a rotor, the stator being connected to the element 1 whereas the rotor is connected to the link 9. The means 12 could of course just as well act pivoting on the link 8.

Independently of the specific design of the means 12, the same should be adapted such that it maintains, in an inactive state, a pivoting position adjusted for an associated link 9 such that this pivoting position only is changed upon positive driving of means 12.

The second power-exerting member 18 is connected relative to the first element 1 and acts on the second four-hinges system FS2 via at least one link arm 21. The member 18 comprises a stationary portion rigidly connected relative to element 1 and a portion movable relative to the stationary portion, the movable portion having to present only one degree of freedom relative to the stationary portion. This movable portion is connected to the four-hinges system FS2 via the link arm 21. It is preferred that the member 18 is formed by a rotary means, the stator of which forms the stationary portion and the rotor of which forms the movable portion. An arm 22 is connected to the movable portion and secured against rotation relative thereto. This arm is via a hinge 23 connected to the link arm 21, which in turn is connected to the element 2 via a hinge 24, although the link arm 21 just as well could be connected to any of the links 14, 15. Since the four-hinges systems FS1 and FS2 in this case are pivotable in parallel planes, it is sufficient that the hinges 23 and 24 have one single degree of freedom and form hinge axes parallel with the axes of the four-hinges systems.

The structure described with assistance of FIG. 3 may be adjusted in the XZ-plane with high speed and precision by an adequate control of the two power members 12, 18 so that in this way the position of the working member 7 in the XZ-plane may be controlled.

It is pointed out that in the disposition according to FIG. 3 the arm 22 and the link arm 21 must be able to pass at the side of the four-hinges systems FS1 and FS2.

Figure 4:
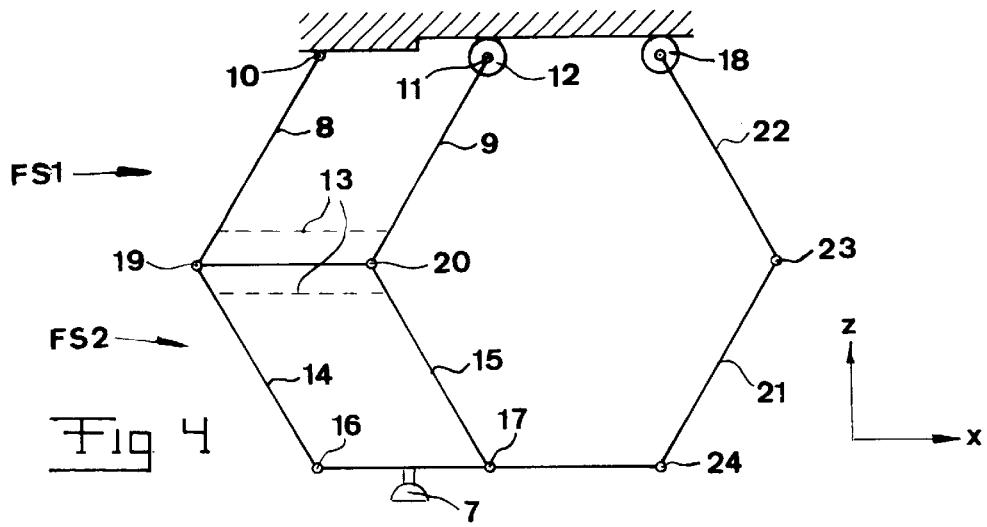
FIG. 4 is a view similar to FIG. 3 but illustrating possible modifications.

In FIG. 4 a robot structure is illustrated which differs from the one shown in FIG. 3 in that the four-hinges systems FS1 and FS2 and the arm 22/link arm 21 are angled away from each other. It is in this connection pointed out that the angle between the arm 22 and the link arm 21 must not, of course, be as large as the angle between the respective pairs of link arms 8, 9; 14, 15 in the four-hinges systems FS1 and FS2; it is the four-hinges systems which define the relative position between the elements 1 and 2 as far as parallelism/mutual orientation is concerned. Thus, the arm 22 and link arm 21 serve only to skew the four-hinges system FS2 in order to vary the position of the working member 7 in Z-direction.

Alternative locations of the third link 13 are illustrated with dashed lines in FIG. 4. Thus, the link 13 may not have to interconnect the hinges 19, 20 although this at times may be preferable.

Figure 5:
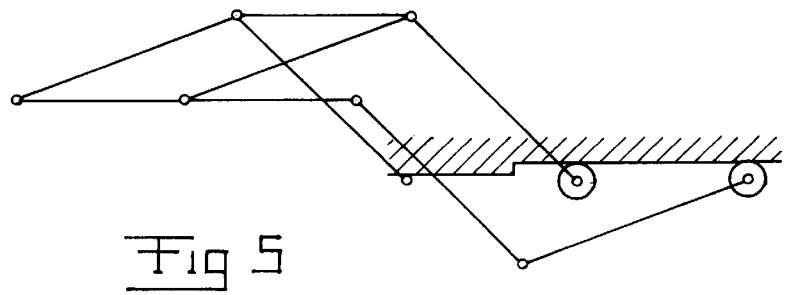
FIG. 5 is a view illustrating the device according to FIG. 4 in an upwardly pivoted condition.
Figure 6:
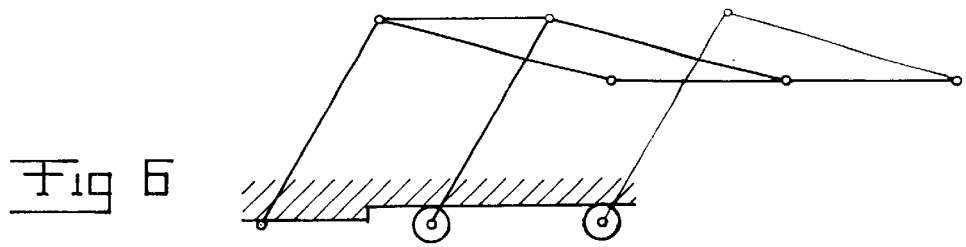
FIG. 6 is a view similar to FIG. 5 with the device pivoted towards the opposite direction, the four-hinges structure according to FIG. 3 being illustrated.

It is illustrated in FIG. 5 that the robot according to FIG. 4 may be pivoted upwardly in one direction into a rather high position. It is pointed out that a corresponding high position also may be achieved in the opposite direction if the links are placed in an adequate three-dimensional order. Such a raised position in opposite direction is illustrated in FIG. 6, the position being achievable by means of the four-hinges composition shown in FIG. 4 in combination with angular movement of the arm 22/link arm 21.

Figure 7:
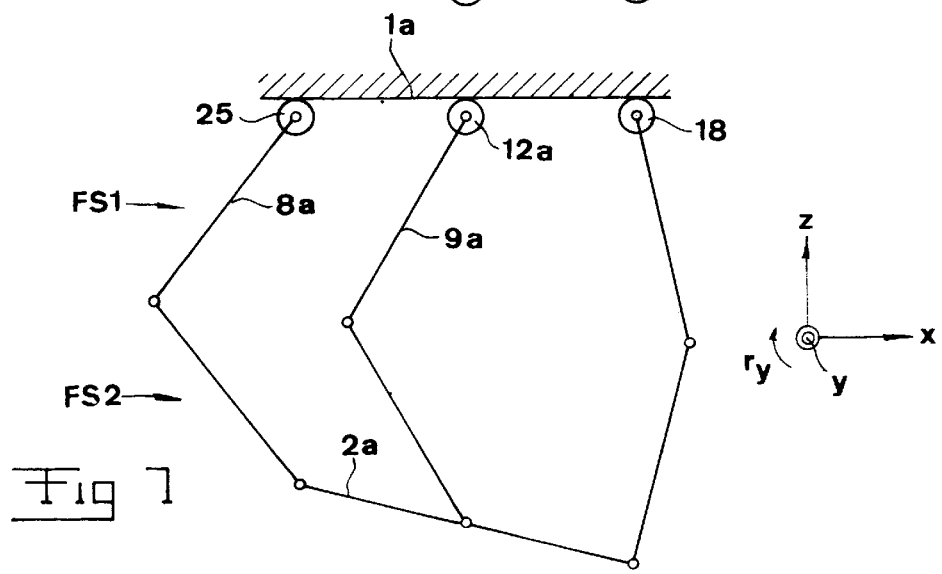
FIG. 7 is a view similar to FIG. 4 of a modified embodiment involving possibility for tilting with respect to the second element.
Figure 8:
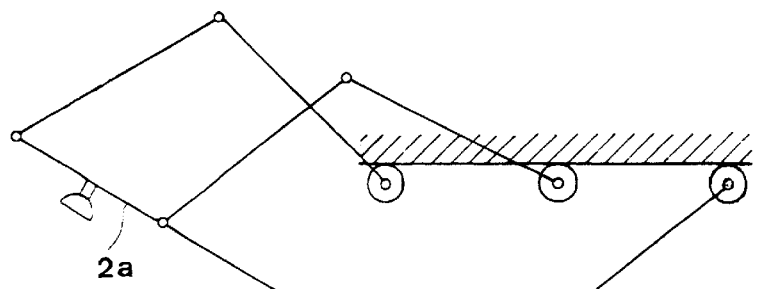
FIG. 8 is a view illustrating the device according to FIG. 7 in alternative position.

An alternative embodiment suitable for enabling the rotation about the Y-axis described with assistance of FIG. 2 is illustrated in FIG. 7. This rotation is indicated with rY. In the embodiment according to FIG. 7, the four-hinges systems FS1 and FS2 are, as before, present but the difference is that the first links 8*a* and 9*a* are arranged to be pivotable independently of each other. For this purpose the embodiment comprises, as before, a power-exerting member 12*a* to pivot the link 9*a* but also a fourth power-exerting member 25 adapted to pivot the link 8*a*. Thus, by pivoting only one of the links 8*a* and 9*a* or both of them with an angular difference, the mutual relation between the first and second elements 1*a* and 2*a* as far as inclination is concerned may be varied. This appears more closely by a comparison with the position illustrated in FIG. 8. Thus, the element 2*a* will, as a consequence of this variation of inclination, be rotated about the axis Y and this rotational movement may be used in a manner which is described with assistance of FIG. 2.

Figure 9:
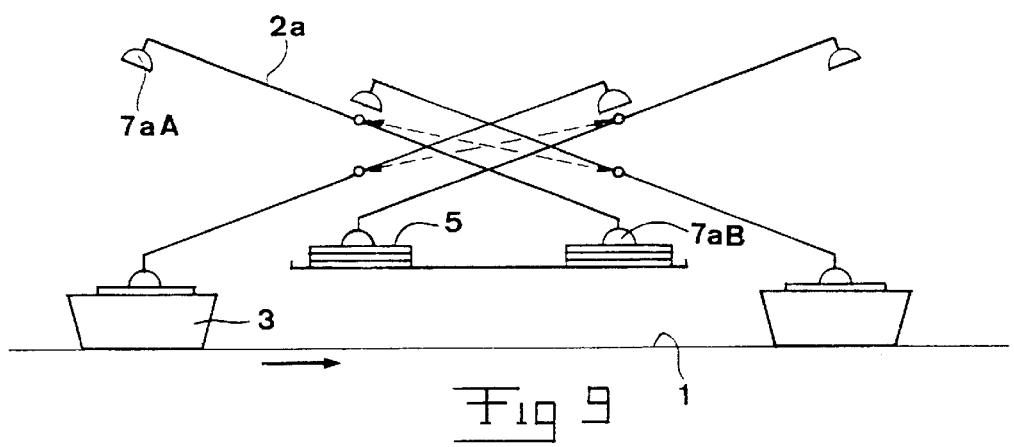
FIG. 9 is a diagrammatical view illustrating the device according to FIGS. 7 and 8 in work.

A further way of gaining the advantages of inclining the element 2 relative to the element 1 in a varying degree is illustrated in FIG. 9. The second element is illustrated with 2a in FIG. 9 and it is shown in four different positions. More specifically, the second element 2a comprises at least two working members 7aA, 7aB arranged in a spaced manner on the element 2a so that the working members assume different positions on inclination of the element 2a relative to the first element 1a, which is not shown in FIG. 9. This can be used so that the working members 7aA and 7aB as indicated in FIG. 9 may be alternatingly caused to grip a component 5 and deposit the same on another component 3 movable along the conveyor 1. There are suitably two magazines or stacks of components 5 available since this reduces the cycle time for the operation in question. Apart from the inclination of the second element 2a, the working members 7aA and 7aB are moved in the X- and Z-directions.

So far it has been assumed that the element 1 is intended to be stationary. However, the element 1 is, in practice, at least in some embodiments, intended to be movable by means of a third power-exerting member 26 (see FIG. 10) in relation to a base member 27.

Robot structures of the nature described with assistance of FIGS. 3–7 are in the following designated as R2, where the number stands for the number of axes of movement of the robot (apart from the previously discussed rotational movements about Y- and Z-axis).

Figure 10:
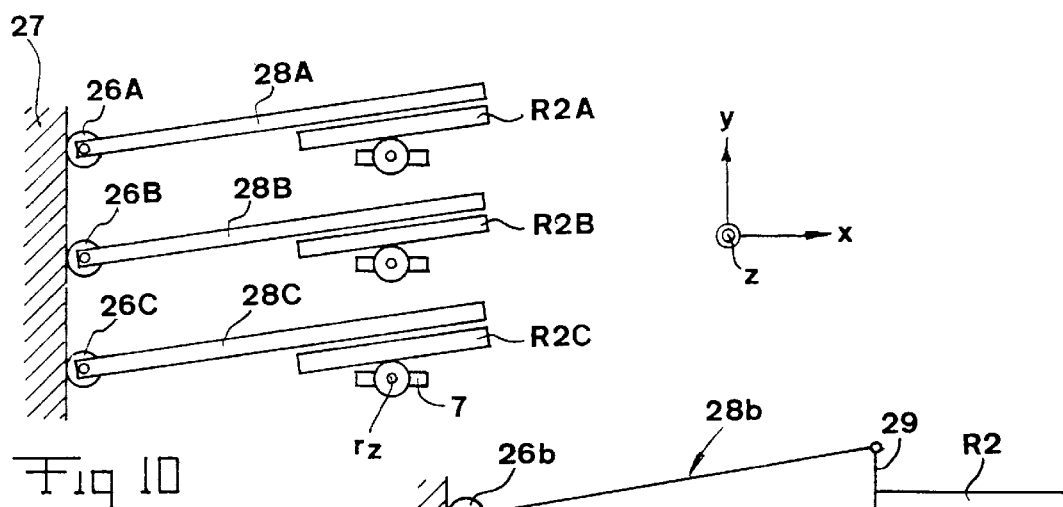
FIG. 10 is a view from above illustrating how several robots according to the invention may be placed close to each other.

It appears from FIG. 10 that R2-robots are placed on carriers 28 movable by means of power-exerting members 26. The first element 1 of the R2-robot is in reality intended to be attached to the carrier 28 or form a constituent thereof. A carrier 28 is pivotable by means of the power-exerting member. More specifically, the carrier 28 is an arm protruding from the base member 27. Several such arms 28A-C are orientated in parallel and they carry robots R2A-C respectively. The robots are located with their respective planes orientated substantially parallel, which makes it possible to achieve a high degree of packing. The power members 26A-C in FIG. 10 may be of an arbitrary type but are here conceived to consist of rotary means having stators secured to the base member 27 and rotors secured to the carrier arms 28. For the rest, it is illustrated in FIG. 10 that the working member 7 on the various robots R2 is thought to be rotatable about the Z-axis.

Figure 11:
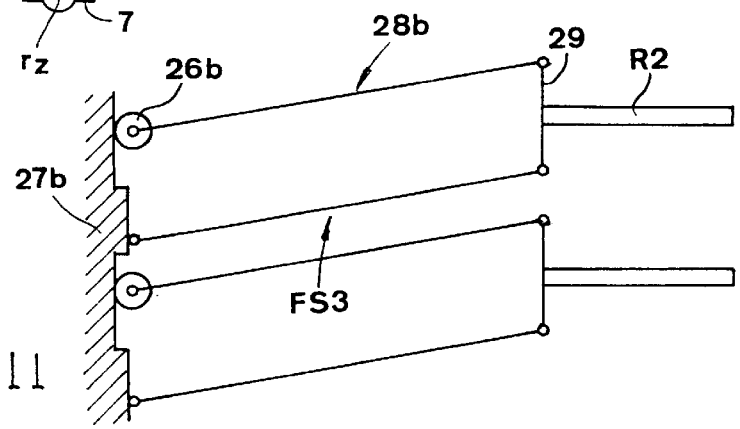
FIGS. 11–13 are views illustrating embodiments forming alternatives to the one in FIG. 10.

It is illustrated in FIG. 11 that the carrier 28b does not have the shape of a pivoting arm but instead is designed as a third four-hinges system FS3. This forms a connection between the R2-robot and the base member 27b. This four-hinges system 28b is preferably a parallelogram and the robot R2 is suitably attached to the parallelogram link 29 turned away from the base member 27b. As before, it is preferably the first element 1 of the R2-robot which is secured to the link 29. Furthermore, it appears from FIG. 11 that several third four-hinges systems may be placed closely adjacent to each other.

Figure 12:
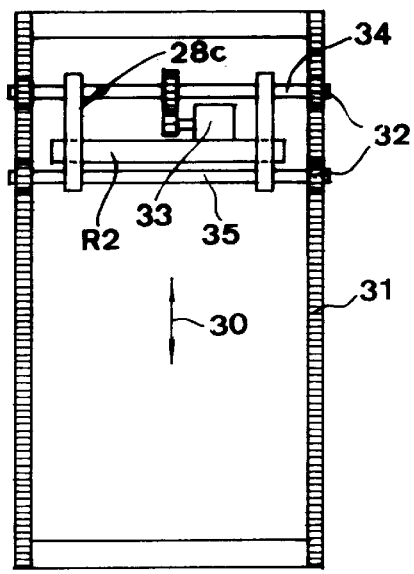

It is illustrated in FIG. 12 that the carrier 28c is displacably movable in a substantially straight direction of movement (arrow 30). The robot R2 is attached to the carrier 28c, which is movable along a path of movement 31. This includes in the example a cog way, with which a gearwheel 32 present on the carrier 28 drivingly engages. On the carrier 28c, which accordingly has the character of a carriage, there is arranged a drive motor 33 capable of putting in rotation an axle 34 provided with a gearwheel 32 via a gear. Another axle 35 provided with gearwheels 32 is arranged on the carrier 28c and the second axle may also, if desired, be driven by means of the drive motor 33.

Figure 13:
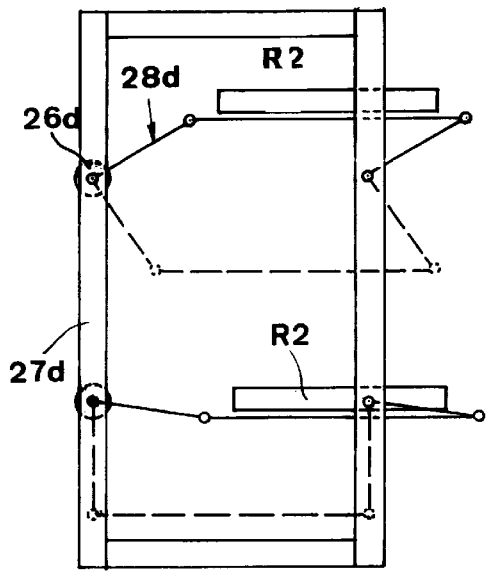

FIG. 13 illustrates a variant of an embodiment already described with assistance of FIG. 11, wherein a carrier 28d for the robot R2 is designed as a four-hinges system forming a connection between the robot R2 and the base member 27d. A motor 26d serves to pivot the four-hinges system 28d and thereby movement of the robot R2. Also here two robots R2 are illustrated as disposed at the sides of each other. Alternative positions for the four-hinges systems are indicated with dashed lines. The four-hinges systems are formed by parallelograms for parallel movement of the robots R2.

Figure 14:
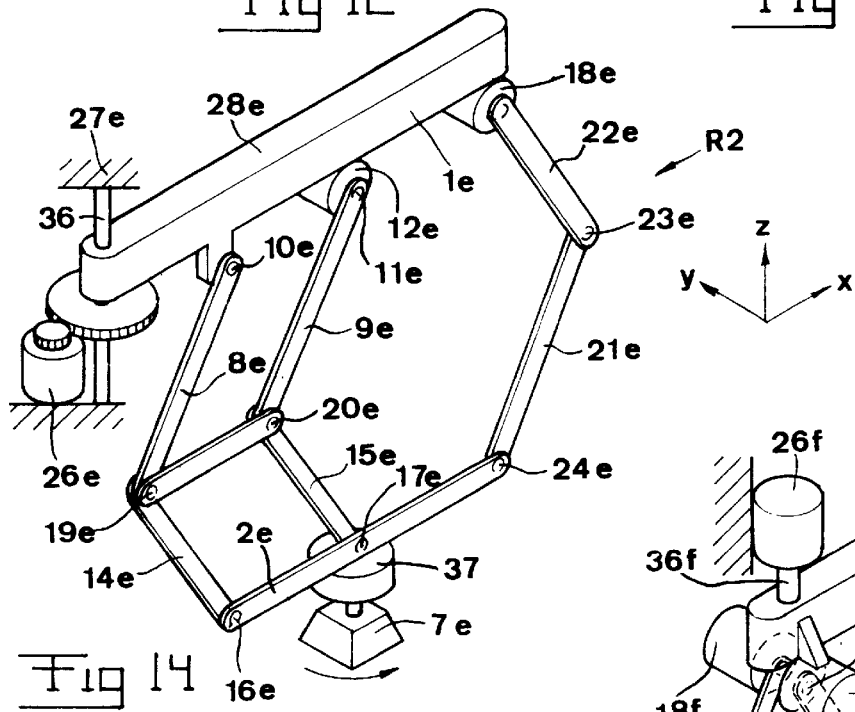
FIG. 14 is a perspective view illustrating an embodiment of a robot according to the invention.

In FIG. 14 a carrier 28e for a robot R2 is illustrated designed as a pivoting arm. The pivoting arm 28e is pivotable about an axis 36 relative to a base member 27e by means of a power-exerting member in the form of a rotary motor 26e. As previously described, there are two power-exerting members 12e and 18e to operate the working member 7e of the robot about two axes, i.e. in the plane XZ. The carrier 28e functions by its mobility to move the two-axes robot R2 in Y-direction. The first element 1e may here be said to form a constituent of the carrier 28e. The working member 27e may be rotatable about the Z-axis by means of a power-exerting member 37 arranged on the second element 2e. For instance, the power member 37 may be formed by a rotary motor.

Figure 15:
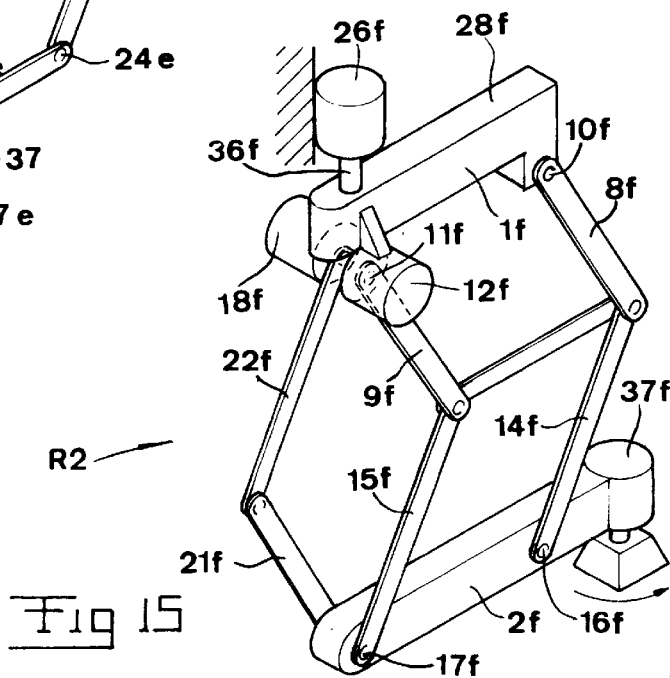
FIG. 15 is a perspective view of a modification of the embodiment according to FIG. 14.

In FIG. 15 a variant relative to the embodiment according to FIG. 14 is illustrated. The pivoting arm 28f is here comparatively short and may be said to be formed by the first element 1f. The pivot axis of the arm 28f is denoted 36f. In this embodiment the two power-exerting members 12f and 18f are arranged relatively close to the pivot axis 36f, since loads at a distance therefrom tend to require high torques of the power member 26f and create important inertia, which involves problems with respect to speed and precision. It is, more specifically, preferred, that the members 12f and 18f are located with their axes of rotation substantially co-axial and so that they substantially intersect a rectilinear extension of the pivoting axis 36f. Thus, the link 9f and the arm 22f are located such that their pivoting axes are substantially co-axial.

It may be established in the embodiments described before, the power-exerting members arranged for pivoting of the four-hinges systems FS1 and FS2 have always been illustrated as arranged on the first element 1e, which is favorable with regard to load since these power-exerting members normally are comparatively heavy and could cause problems as far as acceleration, speed and precision are concerned should they be arranged far out in the link arm structure.

Figure 16:
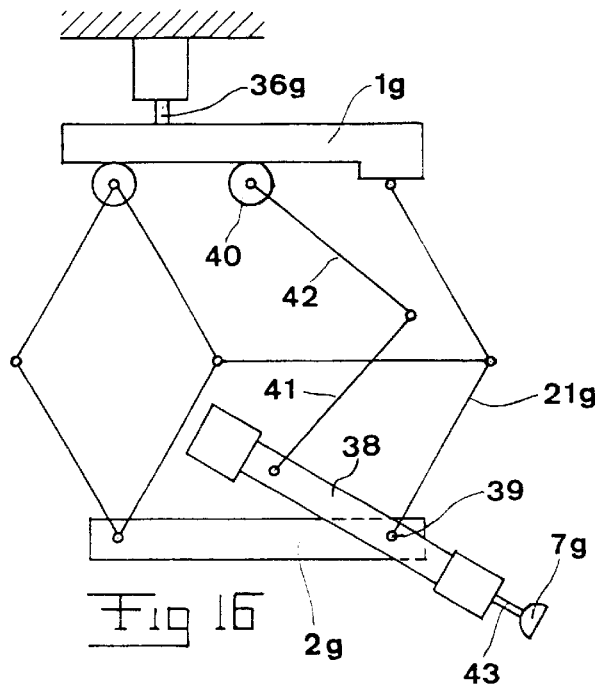
FIG. 16 is a diagrammatical side view of a robot having a pivotable carrying arrangement for a working member provided on the second element.

In FIG. 16 an embodiment is illustrated where on the second element 2g a carrying arrangement 38 for a working member 7g is hingedly connected. The pivot axis of the carrying arrangement 38 relative to the element 2g is denoted 39. The pivot axis coincides in the embodiment with the hinge axis between the link arm 21g and the element 2g, which, of course, is not necessary.

The carrying arrangement 38 is pivotable relative to the second element 2g by means of a fifth power-exerting member 40, which is arranged on the first element 1g, which here forms a carrier, which is pivotable or rotatable about an axis 36. By operating the power-exerting member 40, the orientation of the working member 7g relative to element 2g may, accordingly, be varied as desired. The power-exerting member 40 is arranged on the first element 1g and acts on the carrying arrangement 38 via at least one link arm 41. The member 40 comprises a stationary portion connected to the element 1g and a movable portion actuating, via an arm 42, the link arm 41. The hinges between the link arm 41 and the arm 42, between the link arm 41 and the carrying arrangement 38 and between the stationary and movable portions of the power member 40 only need to have one degree of freedom for pivoting in planes parallel to the plane of pivoting of the four-hinges systems.

Figure 17:
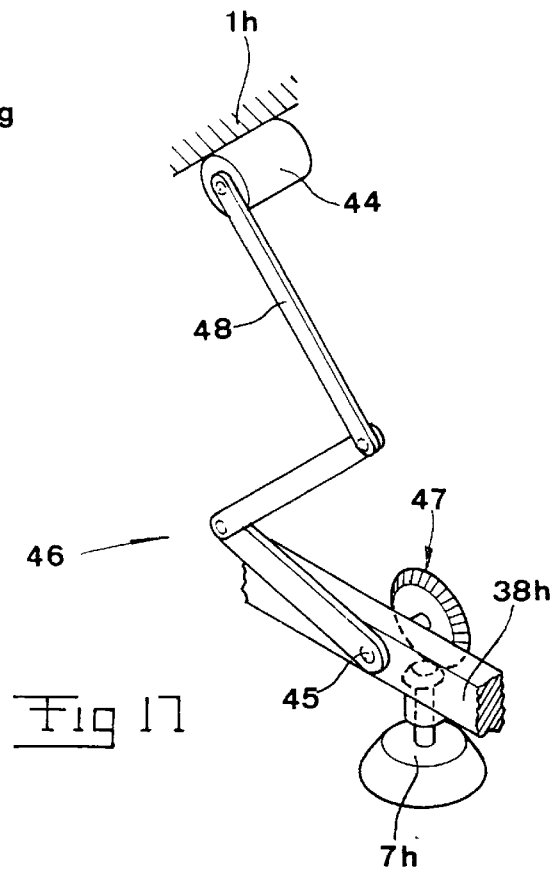
FIG. 17 is a detailed view illustrating a transmission applicable to, for instance, the robot according to FIG. 16.

The working member 7g is in the example intended to be rotatable about an axis 43 relative to the carrying arrangement 38. Thus, a five-axes robot is achieved. For rotating the working member 7g, a rotary motor may be provided on the carrying arrangement 38. However, since this increases the load at the extreme end of the robot, this is not favorable when the demands with respect to speed and precision are high. Instead, the solution illustrated in FIG. 17 may be used. There it is diagrammatically illustrated that a sixth power-exerting member 44 is arranged on the first element ilh. This member 44 is connected to an axis 45. On application of the embodiment according to FIG. 17 on the embodiment according to FIG. 16, the axis 45 is supposed to be journalled in the carrying arrangement 38h. A connection between the power-exerting member 44 and the axis 45 is established by means of a link arm arrangement generally denoted 46. When the member 44 is operated, the axis 45 is caused to rotate. It would be possible to design the working member 7h directly on the axis 45. However, in the example it is preferred that there is a transmission 47 between the axis 45 and the working member 7h. This transmission is here designed as a step-up transmission. For the rest, the transmission 47 may have the character of an angular gear as indicated in FIG. 17. This angular gear is formed by bevelled gearwheels arranged on the axis 45 and an axis of the working member 7h respectively.

The power-exerting member 44 has a stationary portion connected to the element 1h and a movable portion rigidly connected to an arm 48, which by means of at least one and in the embodiment two link arms included in the arrangement 46 is connected to the axis 45.

In case there would not be any pivotable carrying arrangement 38 on the second element 2g in FIG. 16, the device illustrated in FIG. 17 for rotating the working member 7h could be provided on the second element 2g instead of on the carrying arrangement 38.

Figure 18:
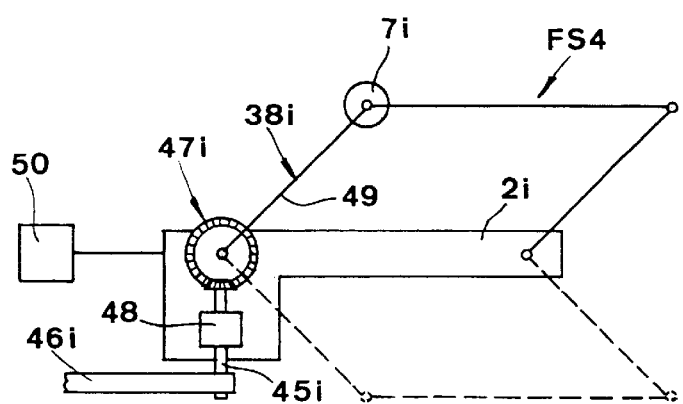
FIG. 18 is a diagrammatical view illustrating an application of the transmission illustrated in FIG. 17.

It is diagrammatically illustrated in FIG. 18 that a device similar to the one in FIG. 17 could be used to put a carrying arrangement 38i, formed by means of an articulated four-links system, in the example a parallelogram which is journalled on the second element 2i by means of two arms, into rotation. The working member 7i is arranged to be put into motion by means of the carrying arrangement 38i, the four-hinges system suitably being movable in a way which will be described more closely with assistance of FIG. 19. The link arm arrangement 46i is connected to an axis 45i, which by means of a bearing 48 is supported on the element 2i. The axis 45 drives, via a transmission 47i, a carrying member 49 contained in the carrying arrangement 38i. More specifically, the carrying member 49 forms a link in the four-links system. The transmission 47i is in the example an angular transmission. A counter-weight 50 balances forces of gravitation and influence eminating from the carrying arrangement 38i and its working member.

Figure 19:
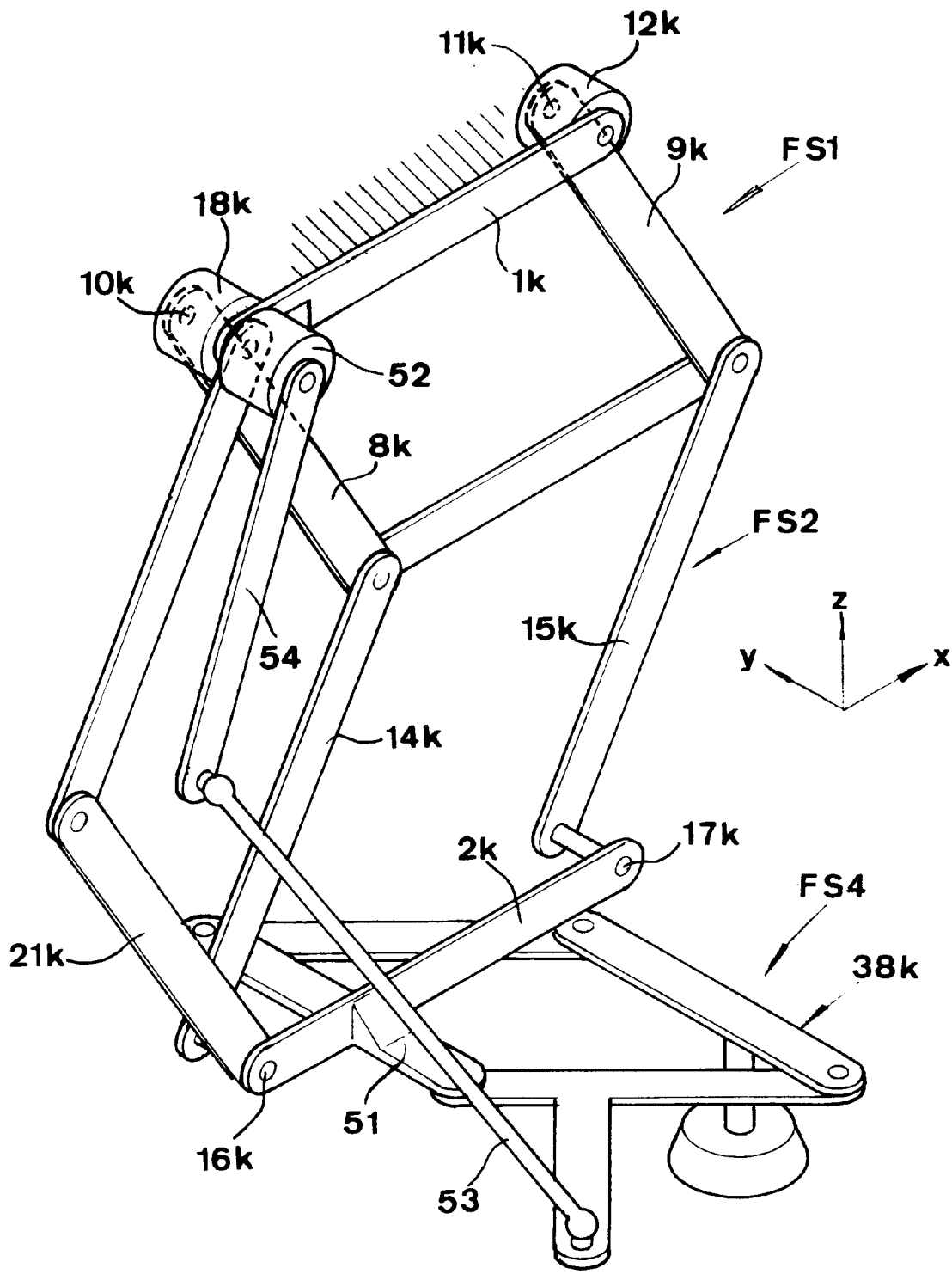
FIG. 19 is a perspective view of an alternative robot embodiment.

In FIG. 19 it is illustrated that a carrying arrangement 38k of a four-links type is connected to the second element 2k.

More specifically, a link 51 in the four-links system is rigidly connected to the element 2k.

The four-links systems FS1 and FS2 included in the robot provide, in the example, for movement in the XZ-plane illustrated. The four-hinges system 38k on the other hand is pivotable in the XY-plane, i.e. perpendicularly to the plane of pivoting of, in the example, the two four-hinges systems FS1 and FS2. Expressed in other words, the four-hinges system 38k is coupled to the four-hinges system FS2 so that the systems FS1, FS2 and FS4 are in series with each other although the coupling between the systems FS2 and FS4 is angled about the X-axis 90° and, besides, rotated substantially 90° about the Z-axis.

The four-hinges system FS4 is suitably caused to pivot in the XY-plane by means of a seventh power-exerting member 52 arranged on the element 1k and at least one link arm 53 between the power member 52 and the four-hinges system FS4. The power member 52 also comprises here a stationary portion rigidly connected to the element 1k and a movable portion connected to an arm 54, which in turn actuates FS4 via the link arm 53. The arm 54 and the movable portion of member 52 have, in the example, a single degree of freedom, namely a pure pivoting movement, relative to element 1k whereas the link arm 53 is coupled to the arm 54 and FS4 via hinges comprising two degrees of freedom.

In FIGS. 20 and 21 a robot is illustrated, which comprises four-hinges systems FS1 and FS2 and a first element 1m. It is diagrammatically illustrated in FIG. 20 that the element 1m forms a carrier rotatable about an axis 36m relative to a base member 27m. The first and second power-exerting members 12m and 18m are arranged on the carrier 1m in the form of rotary motors each having a stator connected to the carrier and a rotor 56 and 57 respectively (see also FIG. 21) arranged to cause the links in the four-hinges systems FS1 and FS2 to pivot.

It appears more closely from FIG. 21 that the rotors 56, 57 are arranged to put, via first transmissions 58 and 59 respectively, for instance gearwheel transmissions, substantially parallel drive axles 60 and 61 respectively into rotation. One 60 of these axles is drivingly connected to a link 9m included in the four-hinges system FS1 via an angular gear 62. The axle 61 is drivingly connected to the arm 22m by means of an angular gear 63.

The drive axles 60, 61 are substantially co-axial to each other and to the pivot axis 36m of the carrier 27m. In order to pivot the carrier 28m relative to the base member 27m, there is arranged a power-exerting member 26m, for instance in the form of a rotary motor, which via a transmission causes the axis 36m to rotate.

One 61 of the drive axles extends through the other drive axle 60, which is designed as a tubular axis. In this way a compact embodiment is achieved with a maximum load centered in the area about the pivot axis 36m of the carrier 28m, which is favorable from the point of view of load.

The axles 60, 61 are journalled relative to the carrier 28m by suitable bearings.

Figure 22:
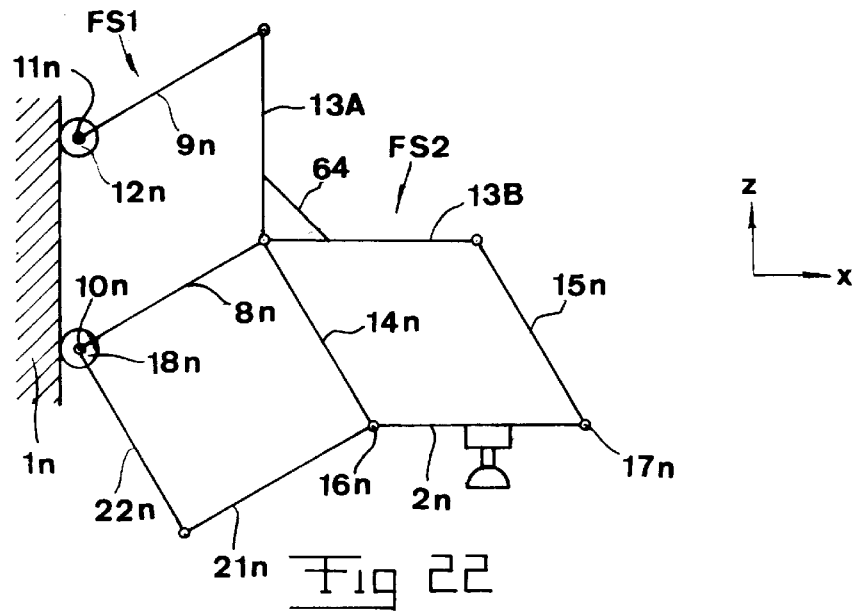
FIG. 22 is a diagrammatical view of an alternative four-hinges system structure.
Figure 49:
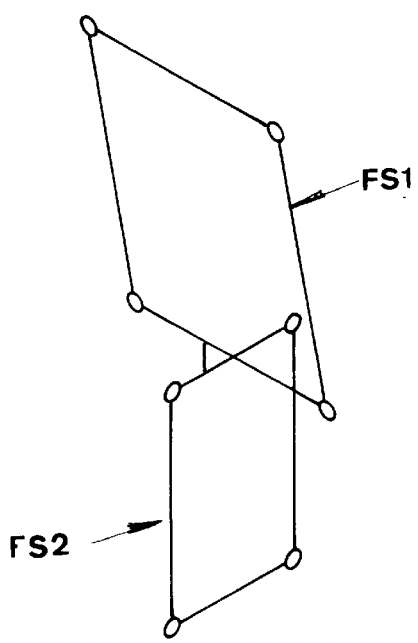
FIGS. 49 and 50 are diagrammatical views of two alternative four-hinges system structures.
Figure 50:
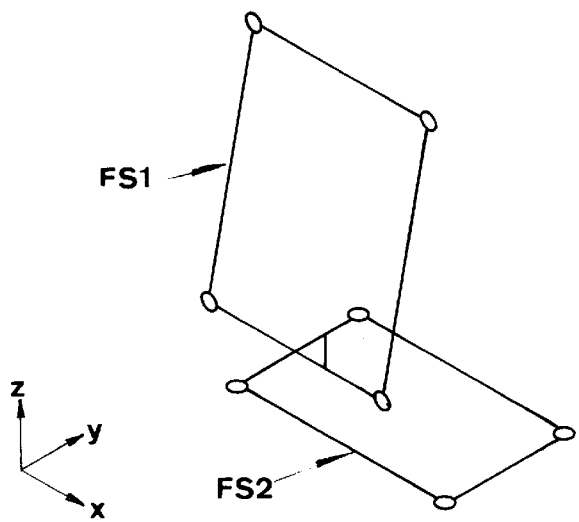

In FIG. 22 a variant is illustrated where two third links 13A and 13B are arranged. A first 13A of these links connects the links 8n and 9n whereas the second 13B connects the second links 14n and 15n. The links 13A and 13B are rigidly interconnected as indicated by the cross bar 64. An angled relation, in the example perpendicular, is involved with respect to the links 13A and 13B. Thus, they constitute in this embodiment not any links relative to each other but only relative to the associated four-hinges systems FS1 and FS2. Although in the embodiment the hinge axes in the two four-hinges systems FS1 and FS2 are conceived to be parallel to each other, it is well possible that the four-hinges system FS2 with its link 13B is connected in such a relation to the link 13A that the four-hinges system FS2 becomes pivotable in planes forming an angle, for instance a right angle, to planes, in which the four-hinges system FS1 pivots. In this connection reference is made to FIGS. 49 and 50 showing two examples thereof. More specifically, the four-hinges system FS1 is pivotable in the XZ-plane in FIG. 49 whereas the four-hinges system FS2 is conceived to be pivotable in the YZ-plane. In FIG. 50 FS1 is pivotable in the XZ-plane whereas FS2 is pivotable in the XY-plane.

In the embodiment according to FIG. 22, the power-exerting member 18n is connected to the element 1n and arranged to actuate the four-hinges system FS2 to pivot in the XZ-plane via the link arm 21n. The member 18n comprises a stationary portion and a movable portion rigidly connected to the arm 22n, which in turn is connected to the link arm 21n. The link arm 21n adjoins, in this example, to FS2 in one of its hinge points although this is not a necessity.

The power member 12n acting on the link 9n effects, accordingly, pivoting of FS1 whereas the power member 18n via the link arm 21n effects pivoting of FS2. The robot, which accordingly is of two-axes type, provides for movement in the plane XZ.

Figure 23:
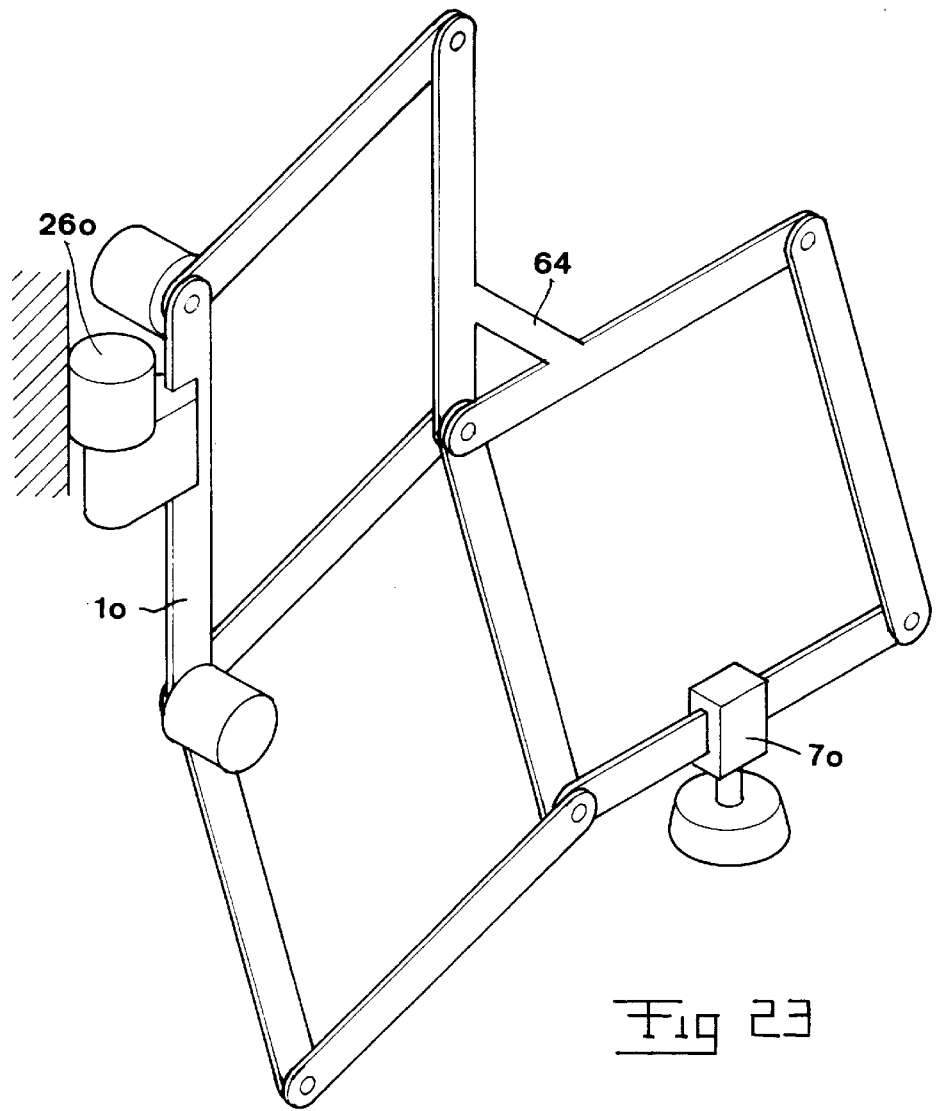
FIG. 23 is a perspective view of a robot application substantially similar to FIG. 22.

The robot diagrammatically illustrated in FIG. 22 appears somewhat more clearly in perspective in FIG. 23, it being, in addition, illustrated that the first element 1o forms a carrier, which by means of a power-exerting member 26o is pivotable about an axis parallel to the Z-axis, whereby accordingly the working member 7o of the robot is provided with mobility in the XY-plane.

Figure 24:
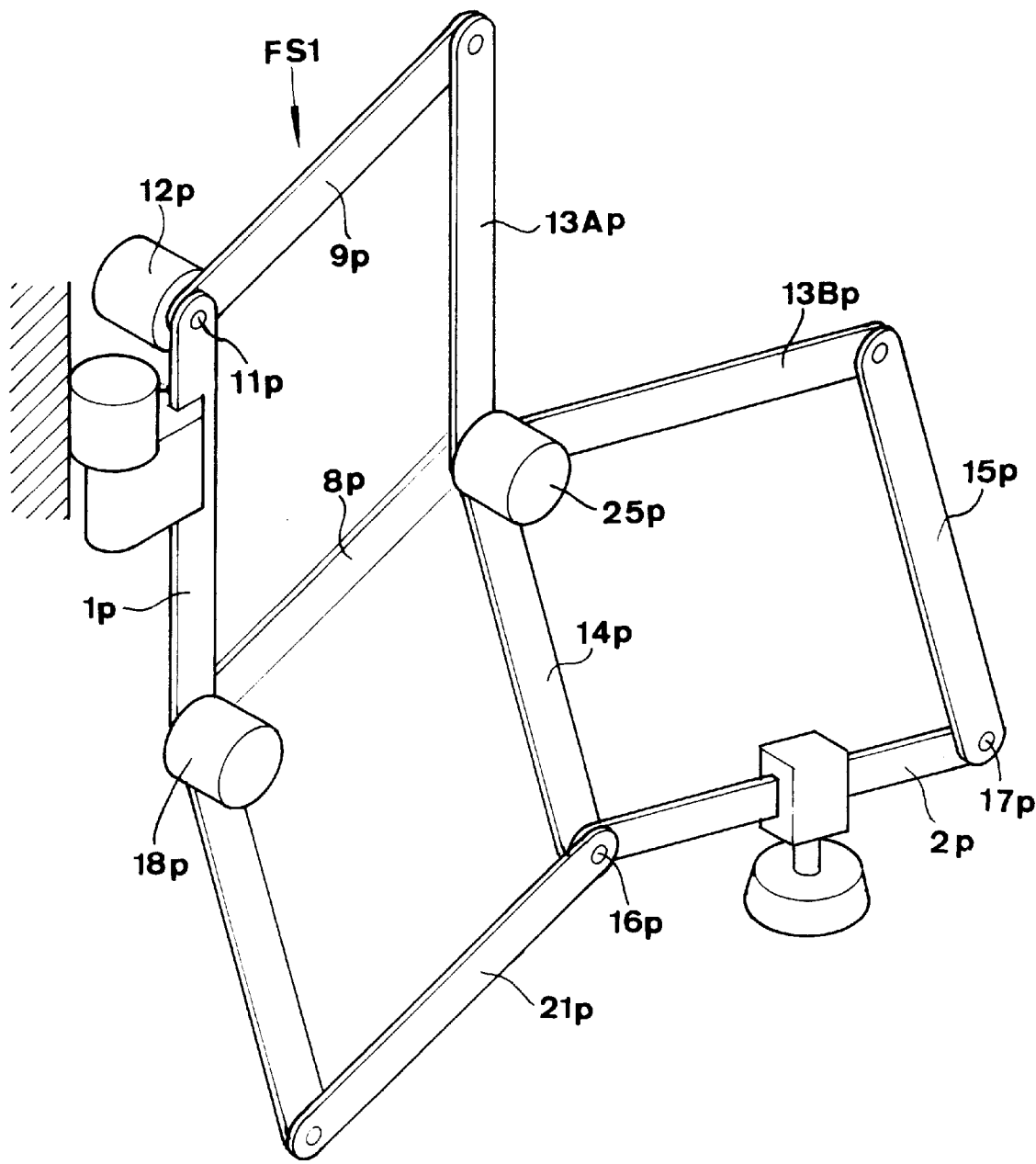
FIG. 24 is a view of a modification of the robot according to FIG. 23.

In FIG. 24 a robot embodiment is illustrated which is similar to the one in FIG. 23 with the exception that there is not any rigid connection between the third links 13Ap and 13Bp. Instead these links are mutually pivotable by means of a fourth power-exerting member 25p. With the four-hinges system FS1 held in stable position by means of the power-exerting member 12p, the link 13Bp may, accordingly, be pivoted relative to the link 13Ap by means of the power member 25p, a fact which with the link arm 21p locked by means of the power-exerting member 18p allows for varying inclination of the second element 2p and, thus, the working member. By means of the power member 25p the links 13Ap and 13Bp may, on the contrary, be mutually locked so that on pivoting of the four-hinges systems FS1 and FS2, the orientation of the second element 2p and the working member is always maintained as a consequence of the parallelogram design of the four-hinges systems.

In FIG. 25 transmission arrangement 65 is illustrated. This is conceived to be used with the assembly of links 8m and 14m also appearing from FIGS. 20 and 21. The hinge of the link 8m relative to carrier 28m is denoted 10m, the hinge between the links 8m and 14m with 19m and the link between the link 14m and the second element 2m, which is not illustrated, is denoted 16m. In FIG. 26 the device is illustrated in the area of the hinge 10m from above in FIG. 25. As appears from a comparison with FIG. 21, the link 8m is not directly coupled to any power exerting member. Accordingly, the hinge axis 10m is not used for pivoting the link 8m, but is instead freely supported about the axis 10m. On the contrary, there is provided on the carrier 28m a drive member 66 to rotate the axis 10m. The member 66 may for instance consist of a member which in its turn is driven, for instance a gear wheel drivable at an angle by means of a further gear wheel 67 arranged on an axis 68. The axis 68 could be driven by a motor arranged on the carrier 28m. On the second element 2m, which is not illustrated, a rotatably driven member 69 is intended to be arranged.

The transmission arrangement comprises transmission members extending along the link assembly 8m, 14m. These transmission members comprise levers 70, 71 and 69, which have two arms and which are pivotably arranged at the hinges of the links 8m and 14m relative to each other and relative to the carrier 28m and the second element 2m about axes parallel with the hinges of the links. A pair of link arms 72 extend between these levers so that pivoting of the lever denoted 70 by means of the axis 10m gives rise to pivoting of the lever 69 by means of the link arms 72 and the intermediate lever 71. This pivoting of the lever 69 is used to pivot, for instance, a working member placed on the element 2m. It appears from FIG. 26 that the link arms 72 suitably are located on either sides of the respective link 8m and 14m and that the lever 70 is formed by two lever parts 70a and 70b connected to the axis 10m and secured against rotation relative thereto.

The links 8m, 14m from the embodiment according to FIGS. 20 and 21 are again illustrated in FIG. 27. In this embodiment the transmission members comprise diverting members 73–75 arranged at the hinges of the links and being rotatably arranged about axes parallel to the hinge axes of the links. About these diverting members two endless loops of traction force transmitting elements 76 and 77 respectively are laid. It is illustrated in FIG. 28 that double diverting members are arranged at the hinge axis between the links 8m and 14m, one of these diverting members being in engagement with one 76 of the traction force transmitting elements and the other with the other 77. By causing the rotatable diverting member 73 at the carrier 28m to rotate, the rotating motion is transferred, via the element 76 and the central diverting members 74, to the second element loop 77 and the outermost diverting member 75. The axis of the latter obtains a rotational movement which may be used, for instance for rotating a working member or executing some other task.

Both variants according to FIGS. 25–28 have the advantage that the movement is transmitted to the extreme end of the four-hinges system FS2 from drive motors provided on the carrier 28m, which means a minimum amount of load on the most extended parts of the robot.

FIG. 29 illustrates an embodiment which in essential regards is similar to the one in FIG. 19. However, the four-hinges system FS4, which is pivotably movable in the XY-plane, is conceived to be pivotable under the influence of a drive member 52q arranged on the element 2q. The embodiment according to FIG. 29 is illustrated from below in FIG. 30. A counter weight 50q balances the weight of the working member.

A fourth four-hinges system FS4 secured to the element 2r so as to be pivotable relative thereto in the plane YZ is illustrated in FIG. 31. Also here a drive member 52r is illustrated as arranged on the element 2r. The orientation of FS4 in FIG. 31 means that it becomes pivotable in planes perpendicular to planes, in which FS1 and FS2 are present.

Instead of arranging drive members on the element 2 as shown in FIGS. 29–32, the drive principle, which has already been illustrated in FIG. 19, with respect to FS4 may be applied so that the drive member is located on the element 1q and 1r respectively.

Figure 33:
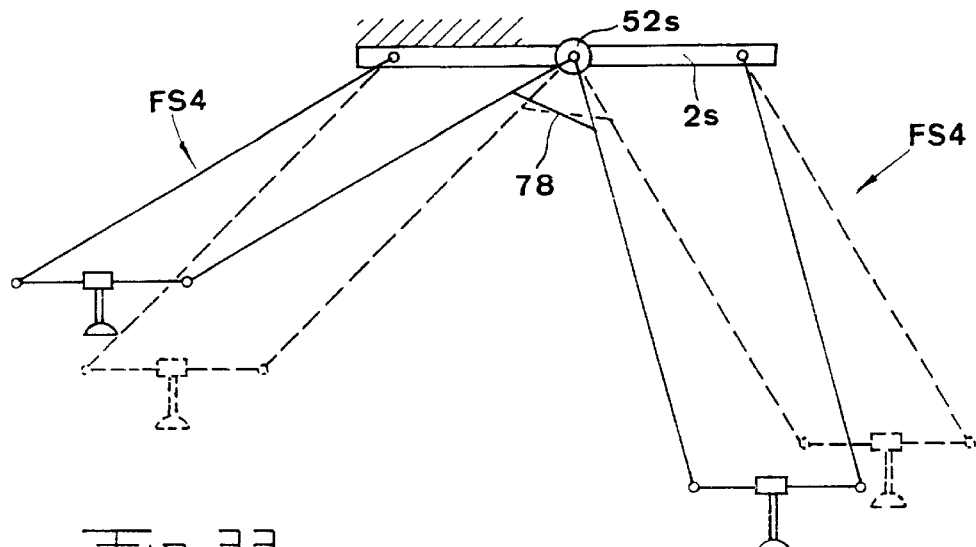
FIG. 33 is a detailed view of an alternative embodiment.

It is illustrated in FIG. 33 that two fourth four-hinges systems FS4 are coupled to a second element 2s in parallel. Each of these four-hinges systems FS4 carries a respective working member. The two four-hinges systems are mechanically coupled to each other for common movement as clarified at 78. In order to pivot the four-hinges systems, a drive member 52s may be arranged on the element 2s or, alternatively, the drive mode illustrated in FIG. 19 or 25–28 may be used. The embodiment according to FIG. 33 is suitable for a rapid parallel handling of two objects by means of the two working members.

Figure 34:
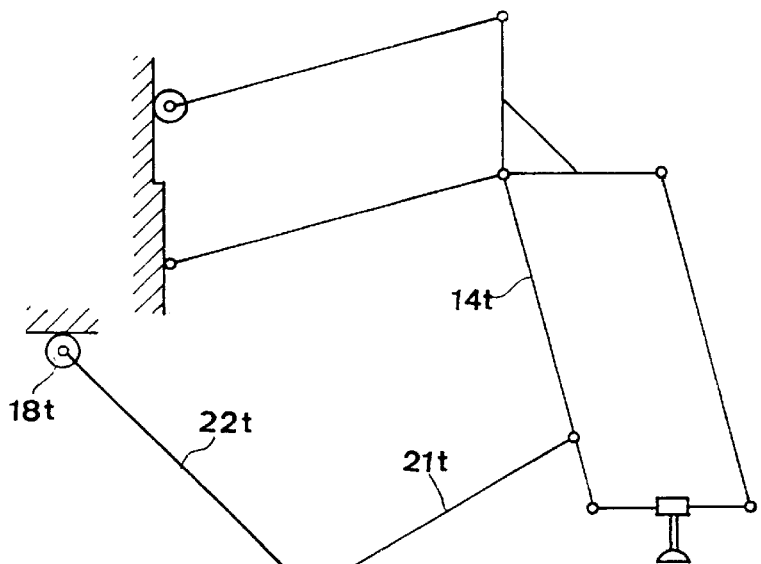
FIG. 34 is a side view of an alternative robot embodiment.

FIG. 34 illustrates an embodiment corresponding to the one shown in FIG. 22 with exception of the link arm 21t being attached to the link 14t. The drive member 18t may be arranged to pivot its associated arm 22t and the link arm 21t in either the XZ-plane or the XY-plane.

Figure 35:
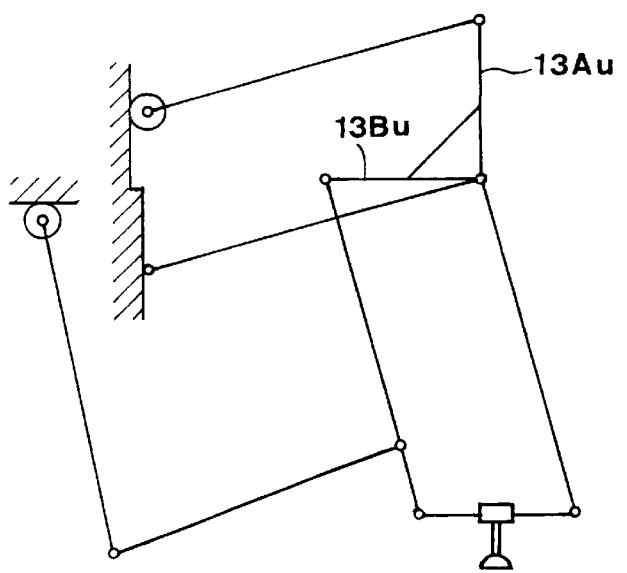
FIG. 35 is a side view of a further alternative.

The embodiment according to FIG. 35 corresponds to the one illustrated in FIG. 34 with the exception of the angle between the links 13Au and 13Bu having been modified relative to FIG. 34. Generally speaking, the angle in question may vary from 0 to 360°.

Figure 36:
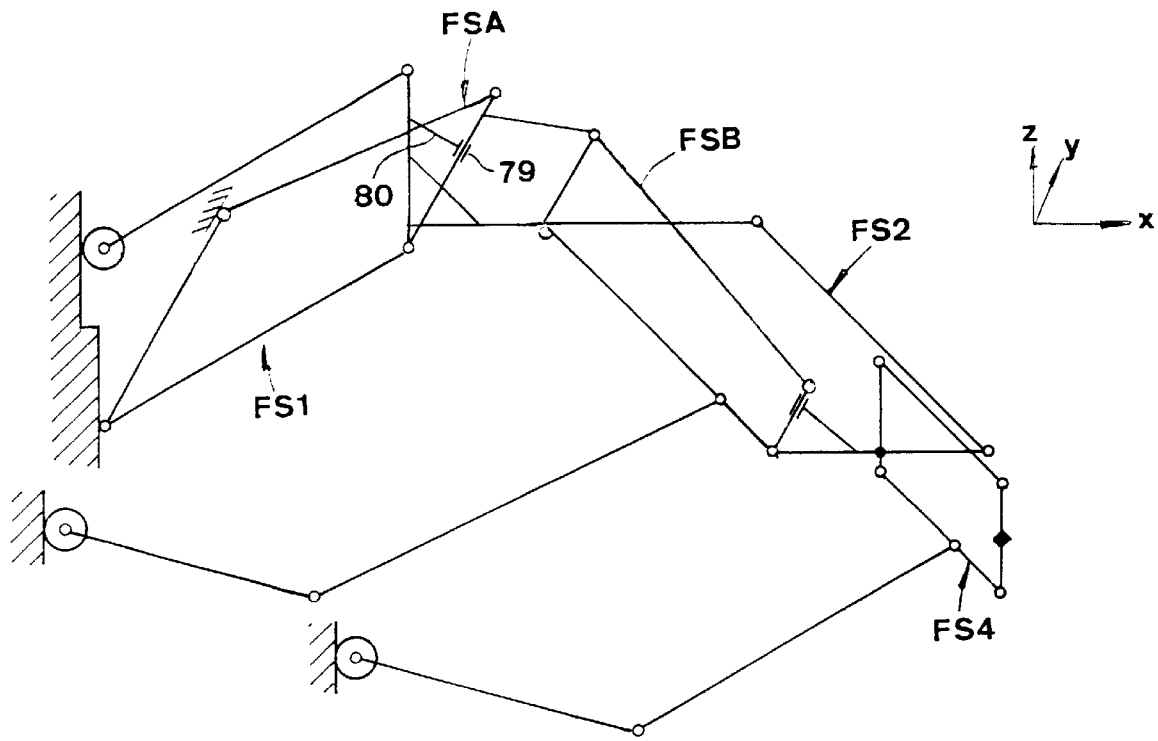
FIG. 36 is a view in a "false" perspective of a robot embodiment with lateral stabilization and three four-hinges systems coupled in series.

FIG. 36 illustrates four-hinges systems FS1, FS2 and FS4, where the four-hinges systems FS1 and FS2 are pivotable in the XZ-plane whereas the four-hinges system FS4 is pivotable in the XY-plane. FIG. 36 illustrates that FS1 may be laterally stabilized by means of a four-hinges system FSA located in a plane perpendicular to the plane of FS1. FS1 may bear laterally relative to FSA by means of a support 80 hingedly connected to FSA at 79. The four-hinges system FS2 is stabilized laterally by means of a four-hinges system FSB extending perpendicularly to FS2.

The four-hinges systems FS2 and FS4 are pivotable by means of separate drive members and link arms.

Figure 37:
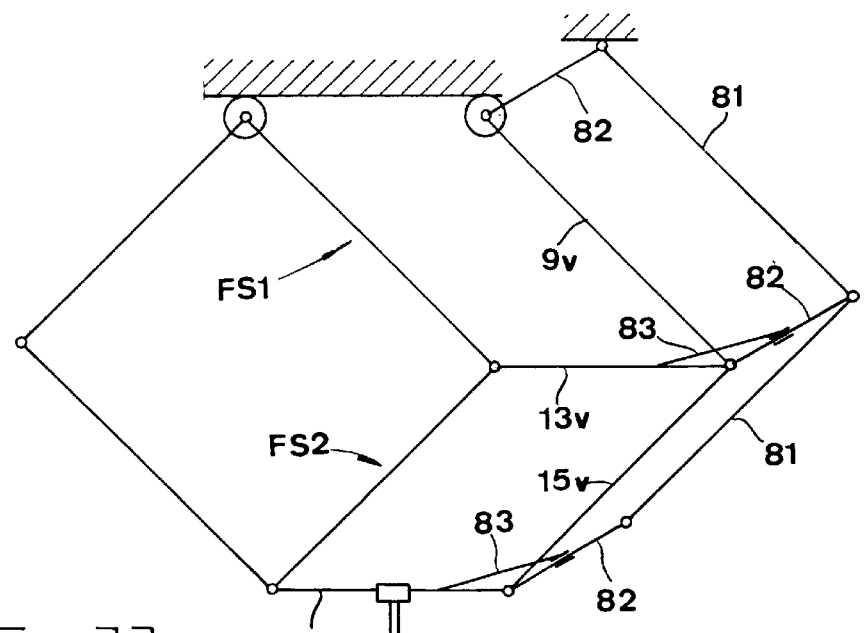
FIG. 37 is a view, as well in "false" perspective, of an alternative embodiment with lateral stabilization.

FIG. 37 illustrates in a "false" perspective that a robot structure similar to the one in FIG. 4 may be stabilized perpendicularly to the plane XZ of the pivoting movement of the four-hinges systems FS1 and FS2 by being provided with auxiliary link arms 81 substantially parallel to the links 9v and 15v but moved in parallelism relative thereto in the direction of the Y-axis. Link arms 82 extend between the links 81 and the links 9v and 15v. These link arms 82 extend, accordingly, in the Y-axis. Support rods 83 are connected to the link 13v and the element 2v and support the four-hinges systems FS1 and FS2 against the link arms 82 via hinge connections between the latter and the support rods 83.

It is illustrated diagrammatically in FIG. 38 that a four-hinges system FS1 pivotable in the XZ-plane is coupled in series with a second four-hinges system FS2, the latter four-hinges system being intended to pivot in the Y-direction, possibly somewhat oblique to the Y-axis, as indicated in FIG. 38 or otherwise parallel to the Y-direction. The four-hinges systems FS1 and FS2 are stabilized laterally by means of extra link arms 84 which via cross bars 85 connect the link arms 84 to FS1 and FS2 respectively. As can be seen from FIG. 38, the link arms 84 may extend obliquely relative to the planes of FS1 and FS2 so that rhombic structures, when viewing in the plane of FS1 and FS2 respectively, are obtained in order to additionally increase the rigidity perpendicularly to the planes of FS1 and FS2 respectively.

FIG. 39 illustrates a variant substantially corresponding to FIG. 36 with exception of lateral stabilization not being illustrated in FIG. 39. Thus, FS1 provides for movement along the Z-axis whereas FS2 provides for freedom of movement in X-direction. Finally, FS4 is conceived to provide for freedom of movement in Y-direction either by pivoting in the plane YZ or in the plane XY. The same four-hinges system structure as in FIG. 39 is illustrated in FIG. 40 in a somewhat different position.

FIG. 41 illustrates that two sets 86 of straight series coupled parallelograms each comprising FS1 and FS2 are coupled to pivot in planes substantially perpendicular to each other. Each of the sets comprises first and second elements 1x and 2x. The first elements 1x are pivotably connected to a base member 27x, which in the example has substantially L-shape, about respective pivot axes 87, which extend substantially perpendicularly to each other and in parallel with the respective pivoting planes of the sets 86. A carrying arrangement 38x is hingedly connected to the two second elements 2x about substantially perpendicular axes 88, which are substantially parallel to the pivot axis 87 between the first elements 1x and the base member 27x.

On each of the first elements 1x there is arranged a respective first power exerting member 12x to pivot one of the links 9x, which are connected to the first element and which are comprised in the respective parallelogram sets. A second power exerting member 18x is arranged on one of the first elements 1x to pivot an arm 22x relative thereto. To this arm a link arm 21x is connected, this link arm being pivotably connected to the second element 2x. The arm 22x and the link arm 21x are pivotable substantially parallel to the associated parallelogram set 86.

By operating the power members 12x and 18x, the carrying arrangement 38, which carries a working member 7x, may now be operated in space as desired in three dimensions. All hinges and pivoting axes described only need to comprise one degree of freedom, i.e. a pure possibility for pivoting, and should be prevented from movement as far as further degrees of freedom are concerned.

The carrying arrangement 38x and the working member 7x may be positioned in space as needed by operating the power members 12x and 18x. The parallelogram sets 86 define the orientation, i.e. inclination in space, of the carrying arrangement 38x and maintains this inclination constant all over the area of movement whereas the arm 22x and link 21x only participate for producing the required operation of the carrying arrangement 38x in space. Thus, it is in total three pivoting axles which in the embodiment according to FIG. 41 achieve the required pattern of movement.

Figure 42:
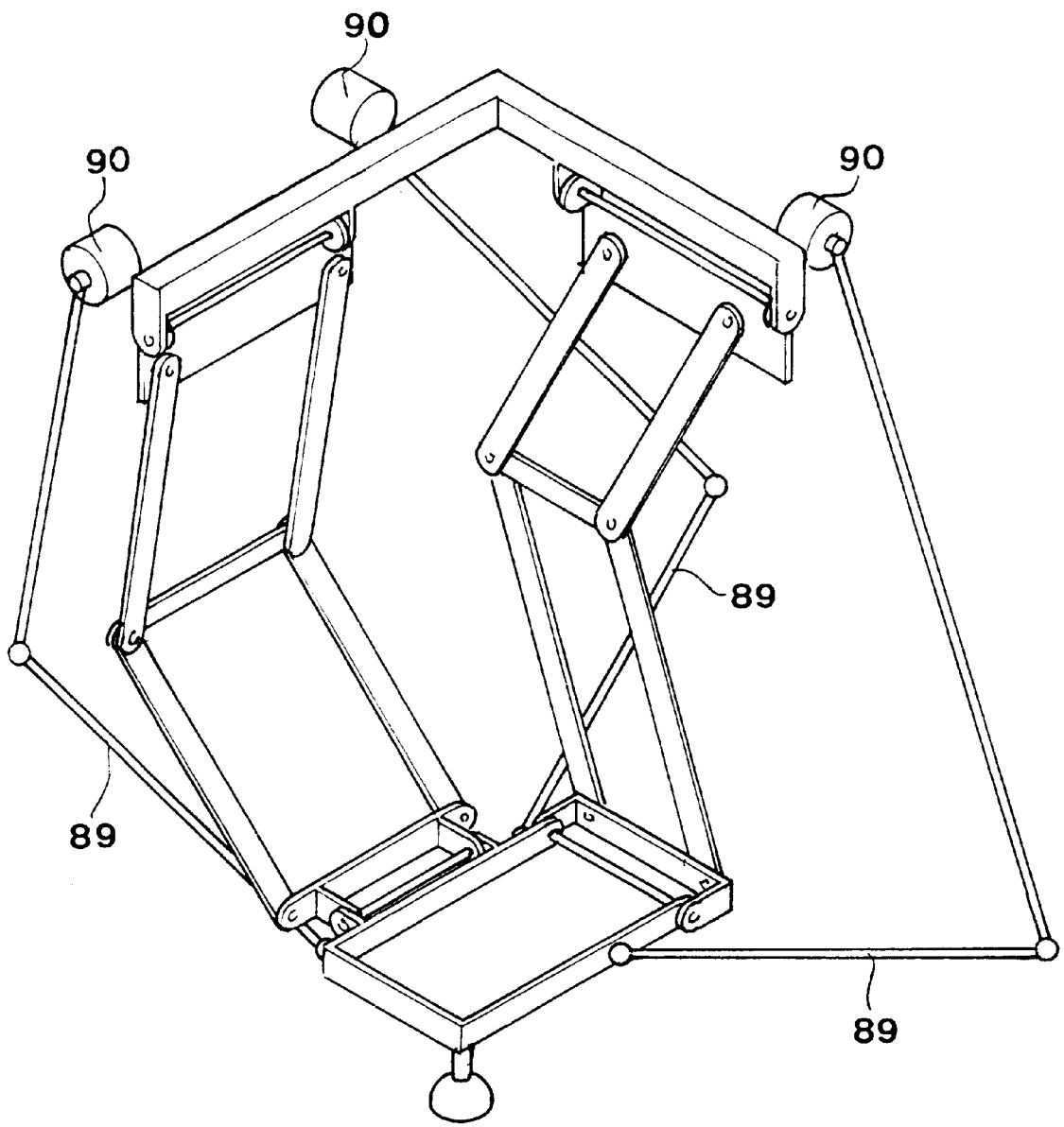
FIG. 42 is a view similar to FIG. 42 but with a certain modification.

In FIG. 42 a modification is illustrated, in which the power members 12x, 18x, the arm 22x and the link arm 21x have been removed and instead three additional link arm arrangements 89 with associated drive members 90 have been provided to control the movement of the carrying arrangement 38x in space. The drive members 90 are suitably located on the base member 27x. The parallelogram sets 86 control, also here, the orientation as far as constant inclination of the carrying arrangement 38x is concerned.

Figure 43:
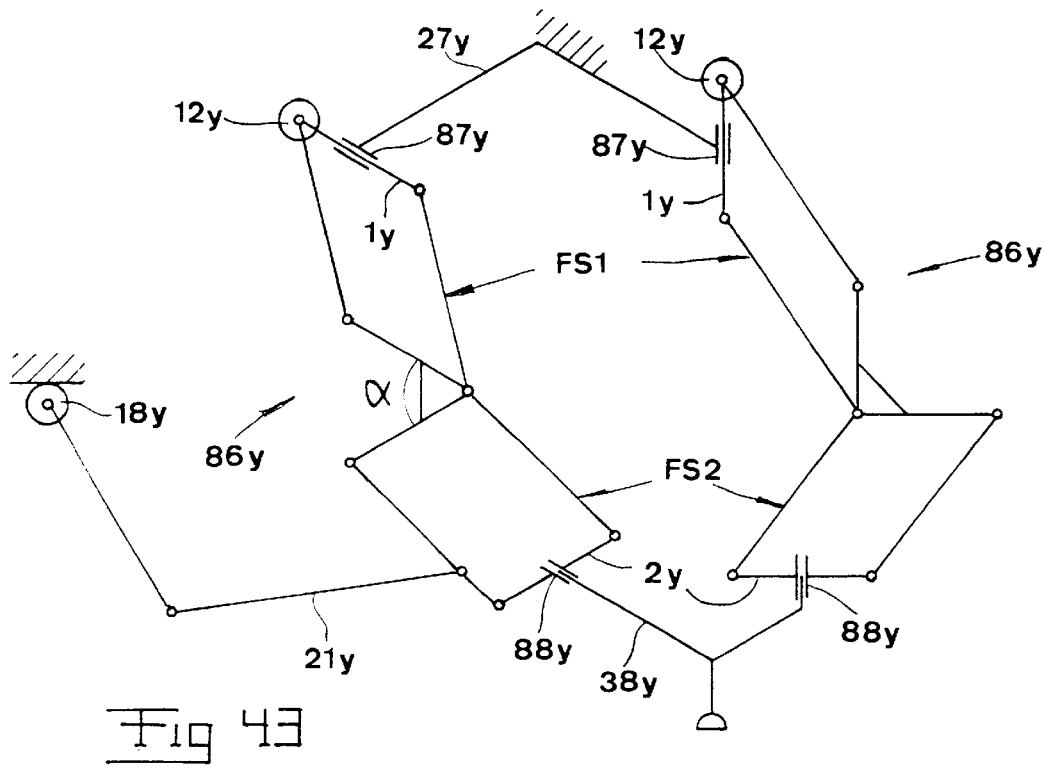
FIGS. 43 and 44 are diagrammatical views in different positions of an embodiment similar to FIGS. 41 and 42.

In FIG. 43 there is illustrated highly diagrammatically a view of an alternative to the embodiment according to FIG. 41. Also in this case there are two sets 86y of parallelograms coupled in series but here these parallelograms FS1 and FS2 in each set are angled mutually, which is indicated by the angle α.

The base member 27y is connected to the first elements 1y of the parallelogram structures via hinges 87y extending perpendicularly relative to each other and more specifically in X-direction and Z-direction respectively. The carrying arrangement 38y is coupled to the second element 2y via hinges 88y parallel to the respective hinges 87y. The four-hinges systems FS1 are pivotable in the respective planes of pivoting by means of power exerting drive members 12y. In addition, there is a drive member 18y, which via a link arm 21y connected to one of the four-hinges systems FS2 to pivot the same.

Figure 44:
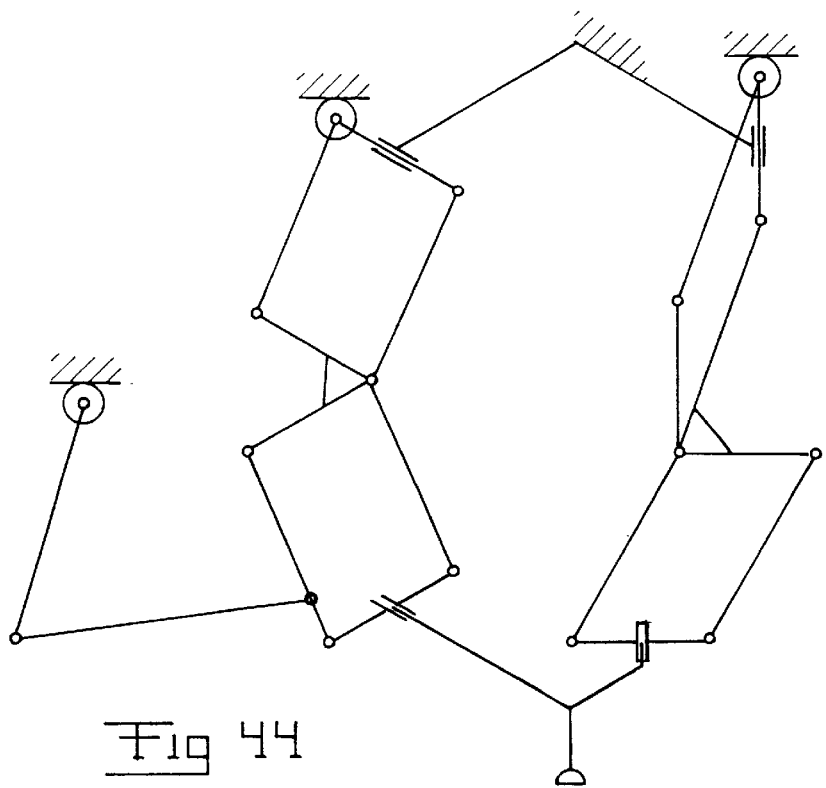

A somewhat varied position of the device illustrated in FIG. 43 is illustrated in FIG. 44 for the sake of clarity.

Figure 45:
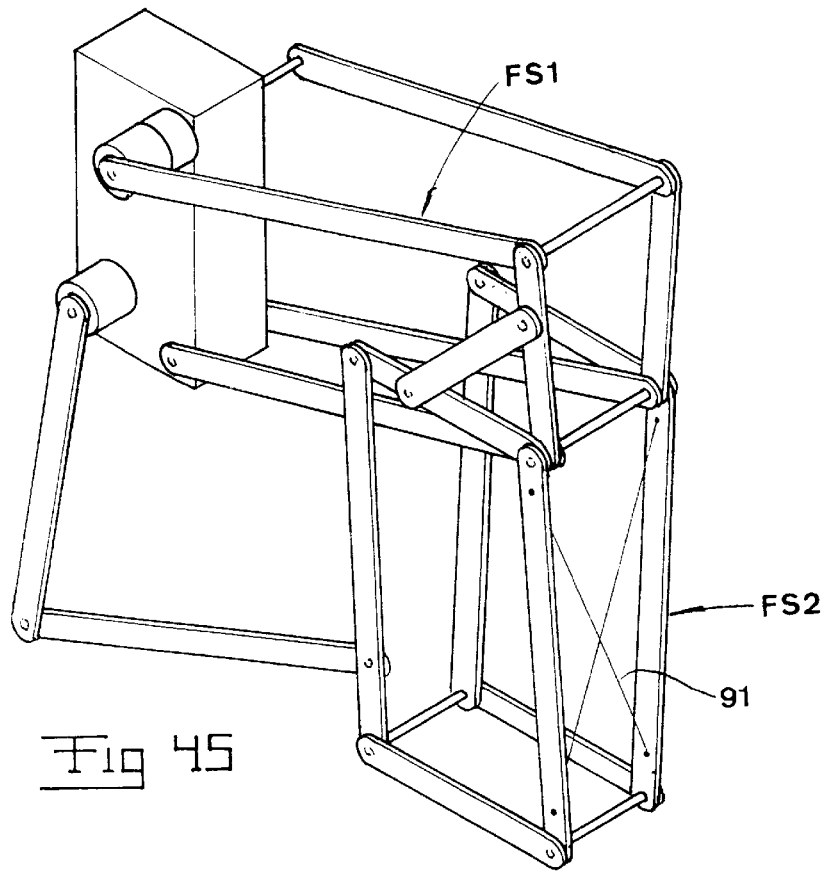
FIGS. 45 and 46 are perspective views of a further robot embodiment in two somewhat differing positions.
Figure 46:
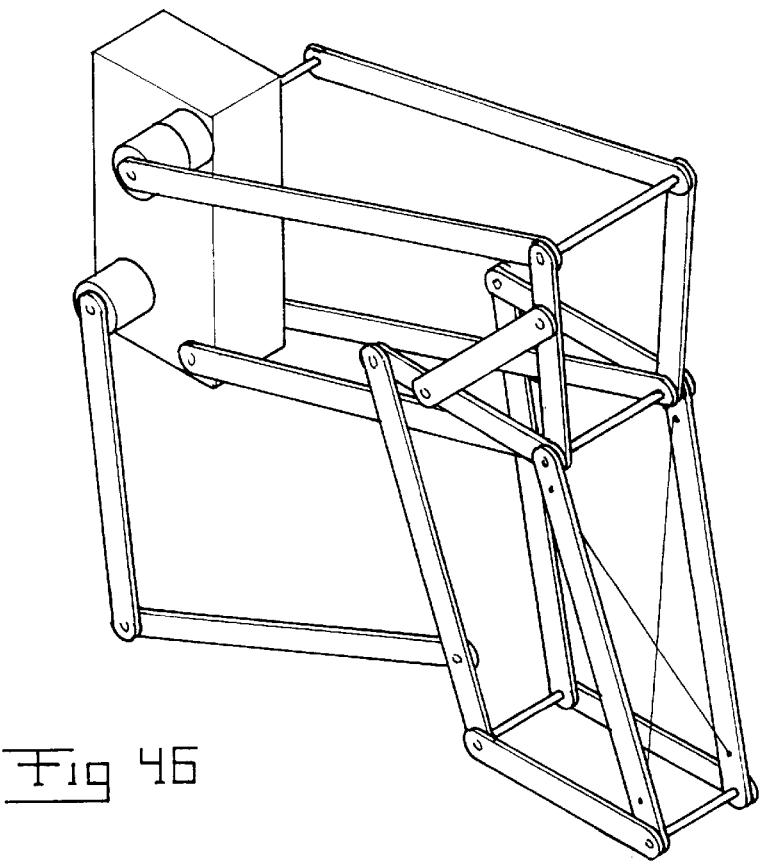

FIG. 45 illustrates an embodiment already shown in FIG. 35, the four-hinges systems FS1 and FS2 in FIG. 45 having been, in addition, doubled in Y-direction and provided with braces extending in Y-direction in order to reinforce the parallelogram assembly to loads in Y-direction. As appears from FIG. 45, the double structure in Y-direction may be such that the parallelogram structures viewed perpendicularly to their hinge axes obtain rhombic configurations tapering in a direction outwardly to the extreme end of the device. Furthermore, it is indicated in FIG. 45 that further stabilizing measures, for instance diagonal braces 91, may be added to establish the required stability. In FIG. 46 it is illustrated for the sake of clarity a somewhat adjusted position, in which the four-hinges system FS2 has been pivoted forwardly relative to the position in FIG. 45.

Figure 47:
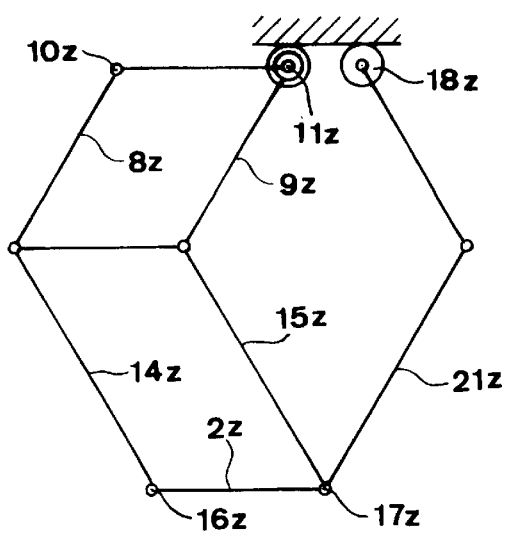
FIGS. 47 and 48 are views illustrating an embodiment for tilting of the second element.
Figure 48:
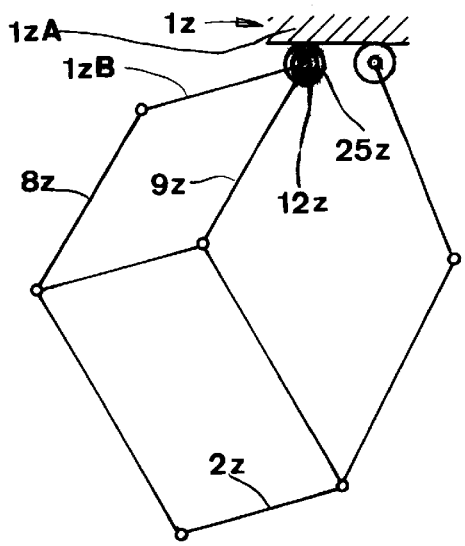

FIGS. 47 and 48 illustrate an embodiment where measures have been taken to adjust the second element 2z into different positions of inclination. For this purpose the first element 1z is formed by two parts 1zA and 1zB, which are hingedly connected to each other. The part 1zB forms, as appears from FIG. 48, a link in the four-links systems FS1. The part 1zA operates primarily as a carrier for the robot structure. The power exerting member 12z already mentioned has a stationary portion rigidly connected to the element part 1zA and a movable portion connected to the link 9z. A fourth power exerting member is denoted 25z and has a stationary portion rigidly connected to the element part 1zA and a movable portion connected to the element part 1zB.

When ordinary operation according to FIG. 47 is intended, the movable portion of the power member 25z is blocked so that the link forming element part 1zB is held permanently in the position according to FIG. 47. Operation by means of a power member 12z gives, as before, rise to pivoting of the link 9z and, accordingly, pivoting of the parallel link 8z, as a consequence of which the orientation of the second element 2z in parallelism with the link 1zB is maintained. When, on the other hand, tilting or inclination of the element 2z is required, the power member 25z is operated such that the link 1zB is pivoted relative to 1zA and 9z. This gives rise to a corresponding pivoting of the element 2z as a consequence of the parallelogram structure.

Figure 51:
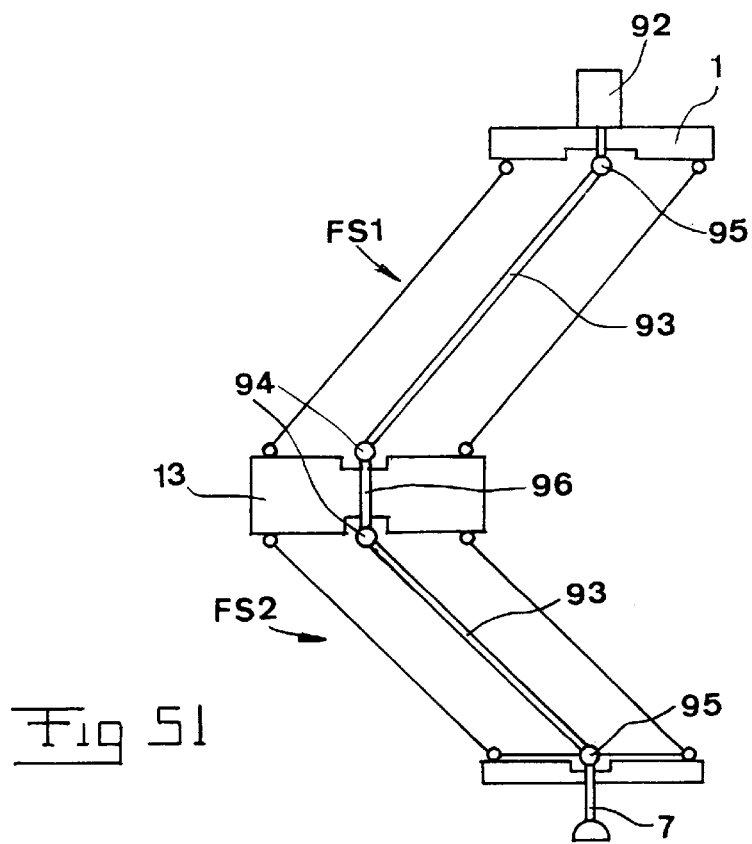
FIG. 51 is a view illustrating a cardan transmission.

FIG. 51 illustrates that a transmission arrangement for power transmission from a drive member 92 on the first element 1 to a driven member, for instance a working member 7, on the second element 2 comprises axles 93 extending substantially parallel to the links in the parallelogram shaped first and second four-hinges systems FS1 and FS2, the axles being interconnected by means of at least one cardan joint 94 and connected to the driving member 92 and the driven member 87 via further cardan joints 95. In order to divide the bending angle in the cardan joint transmission between the axles 93 into two parts, the link 13 in FIG. 1 is designed so as to involve a parallel spacing of the four-hinges systems FS1 and FS2 from each other, the previously mentioned cardan joints 94 and between the same an axle section 96 being present in the border zone between the four-hinges systems and the link 13, which can be considered as a rigid element. Thus, a rotational or pivoting movement may be safely transferred along the parallelogram assembly without need for any splines coupling or similar providing relative displacement, as a consequence of the fact that the axle 93 will be moved in parallelism in correspondence to the links in the parallelogram systems FS1 and FS2.

Figure 52:
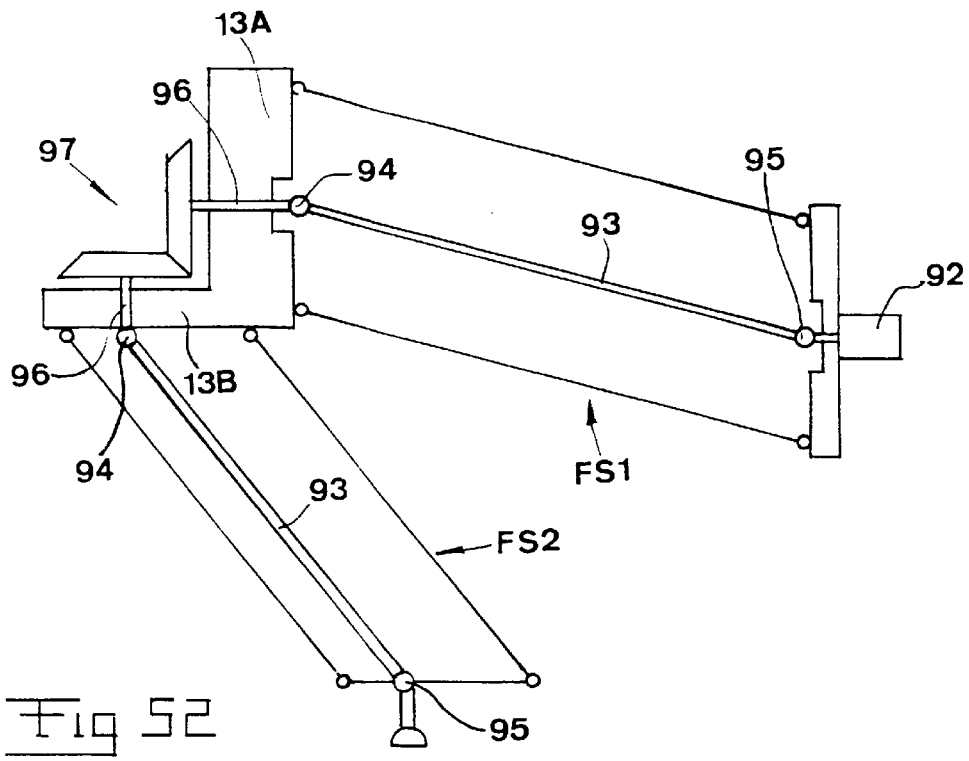
FIG. 52 is a view illustrating a transmission of cardan and angular gear type.

The transmission arrangement is in FIG. 51 illustrated as adjusted for a straight series coupling of parallelogram systems. FIG. 52 illustrates parallelogram systems FS1 and FS2 being coupled to each other in an angled, in the example a right angled, relation by rigid interconnection of the links 13a and 13b. As in the preceding embodiment, axles 93 and cardan joints 94 are used for power transmission along the parallelogram systems FS1 and FS2. In order to bridge the angular displacement between the parallelogram systems FS1 and FS2, i.e. the angle between the links 13a and 13b, it is, however, suggested in FIG. 52 to resort to an angular gear 97 based on conical gear wheels. Thus, axle pieces 96 are coupled to the axles 93 via the cardan joints 94, the axle pieces 96 supporting the conical gear wheels at their ends turned away from the cardan joints 94.

FIG. 53 illustrates an embodiment which can be said to be a modification of the one illustrated in FIG. 23, features in addition having been collected from the embodiment diagrammatically illustrated in FIG. 20. As can be seen in FIG. 53, the first part 1a which forms a carrier 28å, is rotatably movable relative to a base member 27å by means of a third power exerting member 26å. A first power exerting member 12å is adapted to cause the links 9å and 8å to pivot relative to the carrier 28å. The second power exerting member 18å serves for bringing the links 14å and 15å in the second four-hinges system FS2 to pivot. The power member 18å comprises a stationary portion rigidly connected to the carrier 28å and a movable portion 22å connected to the four-hinges system FS2 via a link arm 21å.

The first element 1å is formed by two parts 1åA and 1åB, which are hingedly connected to each other.

A power exerting member 25å is adapted to pivot the part 1åB relative to the second part 1åA. This first part 1åB forms a constituent of the first four-hinges system FS1 in that it is hingedly connected to the two links 8å, 9å. The power member 12å is adapted to pivot the link 9å relative to part 1åA whereas the link 1åB is held stationary by means of the power member 25å. The four-hinges system FS1 is changed as to its form with a constant orientation in space of the second element 2å. For this purpose, the power member 12å is provided with a stationary portion rigidly connected to the part 1åA whereas a movable portion of the power member is rigidly connected to the link 9å.

While keeping the link 9å stationary by means of the power member 12å, the power member 25å may be driven to pivot the part 1åB relative to part 1åA. Such pivoting changes the form of the four-hinges system FS1 so that the inclination of the second element 2å is changed to a desired degree. Also the power member 25å has a stationary portion rigidly connected to the part 1åA whereas a movable portion of the power member is rigidly connected to the part 1åB. The power members 12å, 25å and 18å are in the example all rotor means of a type previously described.

FIG. 54 illustrates an embodiment similar to the embodiment according to FIG. 24 but modified relative thereto. As in the preceding embodiment, the first element 1a comprises two parts 1äA and 1äB hingedly connected to each other. The hinge axis between the same is substantially parallel to the hinge axes in the two four-hinges systems FS1 and FS2. A power member 26ä serves for pivoting the part 1äA relative to a base member 27ä. A part 1äB of the first element, the part forming a link in the four-hinges system FS1, is hingedly connected to the link 9ä via a hinge 11ä and forms a lever with two arms projecting outwardly from this hinge. A power member 25ä acts via a link arrangement 106 on one of the arms of the lever, so that the part 1äB may be pivoted relative to the part 1äA. Such pivoting changes the inclination of the second element 2ä in space. In the example it is illustrated that the power member 25ä has a stationary portion rigidly connected to the base member 27ä and a movable arm like portion 107, which via a link 108 acts on the just mentioned two-arms lever. Since the part 1äA of the first element is pivotable by means of the power member 26ä relative to the base member 27ä, the link arrangement 106, which may comprise one or more links, must comprise at least two hinges, for instance ball joints, having at least two degrees of freedom.

The power member 12ä acts on the link 9ä in the four-hinges system FS1 via a link arrangement 102. More specifically, the link 9ä is designed as a lever having two arms and being hingedly connected to the part 1äB about the hinge axis 11ä. The power member 12ä acts on one of the arms of the lever via a link arrangement 102 in order to change the form of the four-hinges system FS1 whereas the inclination of the second element 2ä is maintained unchanged, this, however, presupposes that the part 1äB at the same time is not pivoted relative to the part 13äA. Also the power member 12ä has a stationary portion rigidly connected to the base member 27ä and a movable portion which via the link arrangement 102 acts on the link 9ä. More specifically, the movable portion has the character of an arm 103, which via a link arm 104 coupled thereto and to the link 9ä by means of hinges having at least two degrees of freedom transfers operating forces.

In this case the power member 18ä is effective for pivoting the links contained in the four-hinges system FS2 via a somewhat more complex link arrangement 98. This comprises, as before, a link arm 21ä connected to the second four-hinges system FS2 but here there are between this link arm 21ä and a movable portion 22ä of the power member 18ä two further links 99, 100, the link 99 of which has the character of a lever with two arms and is hingedly connected to the first four-hinges system FS1 via a hinge 10ä, whereas one of the arms in the lever is hingedly connected to link arm 21ä while the other is connected to the link 100. This link is in turn connected to the arm like movable portion 22ä of the power member 18ä. Since the power member 18ä has its stationary portion rigidly connected to the base member 27ä, hinge connections having at least two degrees of freedom are required in the link arrangement 98. These link connections are, in the example, present between the link 100 and lever 99 and between the link 100 and the movable portion 22ä of the power member 18ä.

Figure 55:
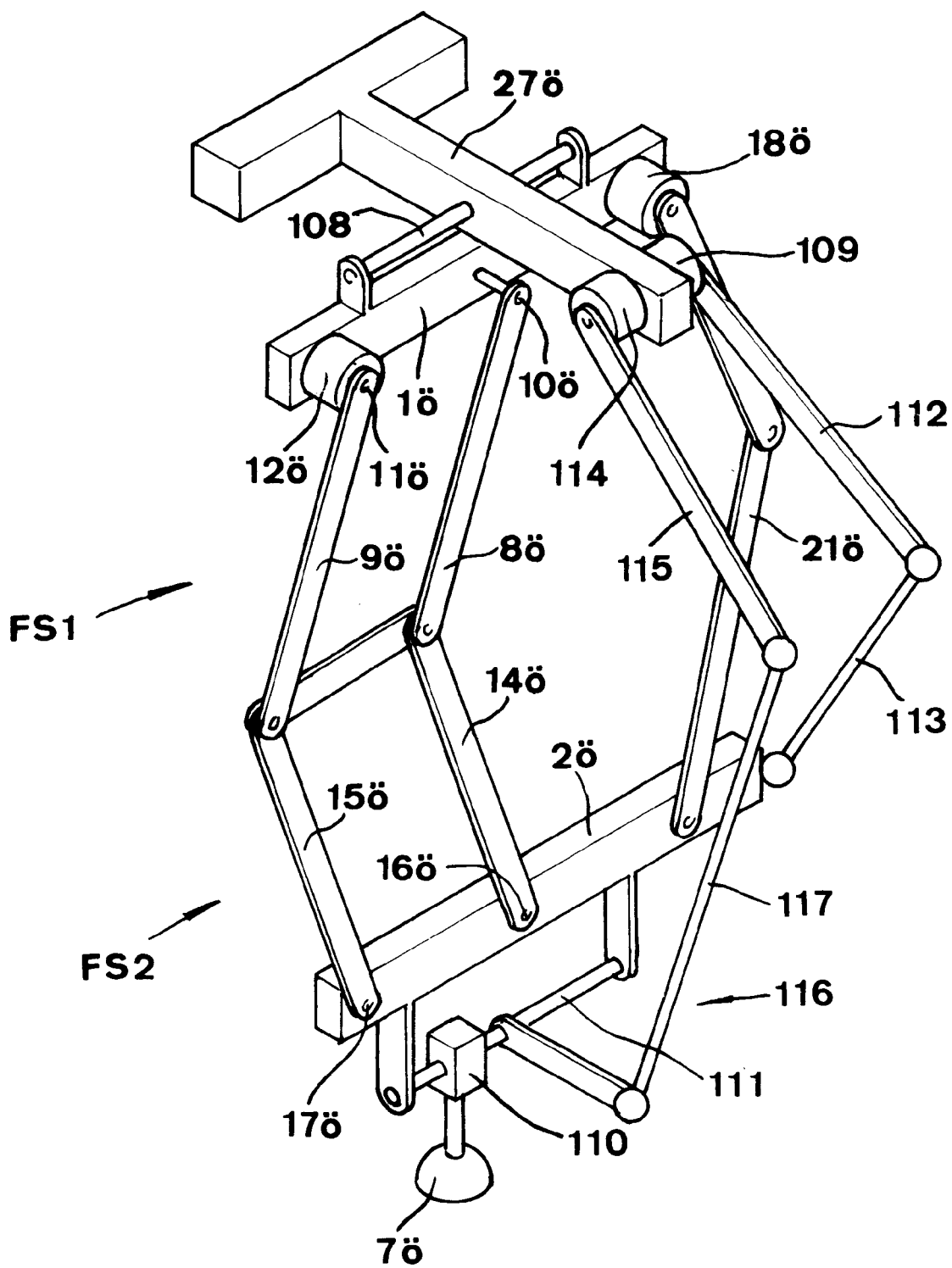
FIG. 55 is a view of a modified embodiment somewhat similar to the one in FIG. 41.

FIG. 55 illustrates an embodiment somewhat similar to the one in FIG. 41. Two four-hinges systems FS1 and FS2 are coupled in series between first and second elements 1ö and 2ö. A power member 12ö serves for changing the form of the four-hinges system FS1 whereas a power member 18ö is arranged on the first element 1ö and acts on the second element via a link arm 21ö for changing the form of the four-hinges system FS2. The first element 1ö is pivotably connected to the base member 27ö about a first pivot axis 108. A power exerting member 109 is arranged to pivot the first element 1ö and, accordingly, the first and second four-hinges systems FS1 and FS2 and the second element 2ö about the pivot axis 108. This power exerting member comprises, in the example. a stationary portion rigidly connected to the base member 27ö and a movable portion 112 acting on the second element 2ö via a link arm 113. The movable portion 112 of the power member has, preferably, an arm like character. The link arm 113 is connected to the arm 112 and the second element 2ö via hinges having at least two degrees of freedom. The power exerting member 109 is arranged to pivot the first element 1ö in a plane of pivoting extending at an angle, preferably a substantially right angle, to planes, in which the four-hinges systems FS1 and FS2 pivot.

A carrying arrangement 110 is pivotably connected to the element 2ö about a second pivot axis 111. This is preferably directed substantially parallel to the first pivot axis 108. A power exerting member 114 is adapted to pivot the carrying arrangement 110 about the pivot axis 111. This power exerting member 114 has, suitably, a stationary portion rigidly connected to the base member 27ö and a movable portion 115, which via a link arrangement 116 acts on the carrying arrangement 110 for pivoting the same. The link arrangement 116 must comprise at least two hinge connections having at least two degrees of freedom. A working member 7ö is connected to the carrying arrangement 110. In order to maintain a certain given orientation of the carrying arrangement 110 in space, the power members 109 and 114 should, via a suitable computer, be controlled relative to each other such that when the elements 1ö and 2ö are pivoted about the axis 108 in a certain direction by means of the power member 109, the carrying arrangement 110 should be pivoted to the same degree, but in the opposite direction about the axis 111 by means of the power member 114.

Common to all described embodiments is that a suitable control unit, in particular in the form of a computer, is arranged to control the power exerting members of the various robot embodiments for the purpose of causing the second element 2 or members coupled directly or indirectly thereto to move in desired paths.

It is evident that the embodiments of the invention given hereinabove are to be considered as isolated examples, which in several ways may be modified within the scope of the invention as defined in the enclosed claims. Generally speaking, it is pointed out that embodiments of series coupling of four hinges systems other than those exemplified may be used within the framework of the invention and also the number of four-hinges systems coupled in series may be modified according to what is desired in the individual case.

It is pointed out that the variant illustrated in FIG. 42 with power exerting members 90 and link arms 89 for operation of the carrying member 38x is also applicable in the embodiment described with assistance of FIG. 43, in which case the power members denoted 12y and 18y are deleted and instead three link arms 89 are connected hingedly to the carrying member 38y and these link arms are arranged to be actuated by the power exerting members 90 provided on the base member 27y. The members 90 are adapted to pivot the links 89 in non-parallel planes.

With respect to the various transmission arrangements having been described with assistance of FIGS. 16–18, 25–28 and 50–51, it is remarked that they, of course, may be "prolonged" in an analogous manner in more complex link arm structures.

A four-hinges system fs4 such as that in FIG. 19 could also be used in the embodiments according to figs. 22–24 and 53–54 in an analogous manner.

What is claimed is:

1. A device for relative movement of two elements said device comprising articulated links interconnecting the elements and at least two power-exerting members to exert power for the relative movement of the elements, at least two first links connected relative to a first of the elements via hinges, said first links being pivotable in substantially parallel planes relative to the first element under influence of at least a first of the power-exerting members and at least two second links connected relative to a second of the elements via hinges, said second links being pivotable in substantially parallel planes relative to the second element under influence of at least a second of the power-exerting members, said at least two first links forming a first four-hinges system, said at least two second links forming a second four-hinges system, the two four-hinges systems being coupled in series to each other between the first and second elements, the second power-exerting member being connected relative to the first element and acting on the second four-hinges system via at least one link arm, and a fourth four-hinges system is coupled to the second four-hinges system so that the first, second and fourth four-hinges systems are in series with each other.

2. A device according to claim 1, wherein said at least two first links and said at least two second links are pairwise hingedly connected to each other.

3. A device according to claim 1, wherein at least one third link interconnects pivotably at least one of the following: (a) the two first links and (b) the two second links.

4. A device according to claim 3, wherein the first and third links and the first element form a first articulated four-links system.

5. A device according to claim 3, wherein the second and third links and the second element form a second articulated fourlinks system.

6. A device according to claim 4, wherein the third link is common to the two articulated four-links systems.

7. A device according to claim 1, wherein the first and second four-hinges systems form parallelograms.

8. A device according to claim 1, wherein at least one third power-exerting member is arranged to move the first element relative to a base member.

9. A device according to claim 1, wherein the first and a fourth of the power-exerting members are adapted to act on a respective one of the first links which causes pivoting relative to the first element, and that the first links are arranged to be independently pivotable, whereby a mutual relation between the first and second elements as far as inclination is concerned is variable by one or both of the following: (a) pivoting of only one of the first links and (b) pivoting of both links with an angular difference.

10. A device according to claim 1, wherein the first element is formed by two parts, which are hingedly connected to each other, a fourth of the power-exerting members is arranged to pivot a first of the parts relative to a second of the parts, the first part forming a constituent of the first four-hinges system and being hingedly connected to the two first links.

11. A device according to claim 1, wherein said at least one first power-exerting member comprises a stationary portion connected relative to the first element and a movable portion connected to one of the first links and being arranged to cause this one of the first links to pivot relative to the first element.

12. A device according to claim 1, further comprising two third links, a first of the third links interconnects the two first links, a second of the third links interconnects the second links and the first and second of the third links are connected to each other.

13. A device according to claim 1, wherein the hinges in the first four-hinges system form hinge axes, which are mutually substantially parallel, and that the hinges in the second four-hinges system form hinge axes, which are mutually substantially parallel.

14. A device according to claim 12, wherein the first and second of the third links are connected to each other in an angled relation.

15. A device according to claim 13, wherein the hinge axes in the first four-hinges system are substantially parallel to the hinge axes in the second four-hinges system.

16. A device according to claim 13, wherein the hinge axes in the first four-hinges system extend at an angle to the hinge axes in the second four-hinges system.

17. A device according to claim 12, wherein the first and second of the third links are rigidly connected to each other.

18. A device according to claim 13, wherein the first and the second of the third links are mutually pivotable by means of a fourth power-exerting member for changing the mutual orientation of the first and second elements with regards to inclination.

19. A device according to claim 1, wherein the second power-exerting member comprises at least one stationary portion rigidly connected relative to the first element and a portion movable relative to the stationary portion, said movable portion having one degree of freedom relative to the stationary portion, and the movable portion is connected to the second four-hinges system via the link arm.

20. A device according to claim 19, wherein the second power-exerting member is formed by a rotary motor, a stator of which forms said stationary portion and a rotor of which forms the movable portion, an arm is connected to the movable portion and secured against rotation relative thereto, and said arm is hingedly connected to the link arm.

21. A device according to claim 9, wherein the second element comprises at least two working members provided in a spaced relation on the second element to obtain different positions on inclination of the second element relative to the first element.

22. A device according to claim 8, wherein the first element is either of the following: (a) arranged on and (b) forms a constituent of a carrier movable by means of the third power-exerting member.

23. A device according to claim 22, wherein the carrier is pivotable.

24. A device according to claim 22, wherein the carrier is a third four-hinges system forming a connection between the first four-hinges system and the base member.

25. A device according to claim 22, wherein the carrier is displacably movable in a substantially straight path of movement.

26. A device according to claim 22, wherein the carrier is movable for displacement of the first element, the second element and the two four-hinges systems in a direction at an angle to planes, in which one or both of the following are pivotable: (a) the first links and (b) the second links.

27. A device according to claim 23, wherein a pivot axis of the carrier relative to the base member is located substantially opposite to the first and second power-exerting members.

28. A device according to claim 1, further comprising a carrying arrangement for a working member hingedly connected to the second element, the carrying arrangement is rotatable relative to the second element by means of a fifth power-exerting member, which is arranged on the first element and is adapted to actuate the carrying arrangement via at least one link arm.

29. A device according to claim 28, wherein the working member is rotatably provided on the carrying arrangement.

30. A device according to claim 1, further comprising a rotatable working member arranged on the second element, a sixth power-exerting member for rotating the working member is arranged on the first element and connected to an axle arranged on the second element via a link arm arrangement, and the axle is arranged to be imparted a rotational movement producing rotation of the working member on pivoting of the link arm arrangement.

31. A device according to claim 30, wherein the axle is arranged on one of the following; (a) on the carrying arrangement, (b) on the second element.

32. A device according to claim 28, wherein on the second element there is arranged a first rotation axle, which is adapted to be put into rotation by the link arm arrangement and which is arranged to put one of (a) the carrying arrangement and (b) a carrying member of the carrying arrangement into rotation.

33. A device according to claim 32, wherein the carrying member is rotatable about a second axis of rotation and that the first and second axes of rotation are in engagement via an angular transmission.

34. A device according to claim 28, wherein the carrying arrangement is formed by the fourth articulated four-links system, in which the carrying member forms one of the links.

35. A device according to claim 1, wherein the fourth four-hinges system is pivotable in planes extending at an angle to planes of pivoting of the second four-hinges system.

36. A device according to claim 1, wherein the fourth four-hinges system is movable by means of a seventh power-exerting member arranged on the first element and at least one link arm between the seventh power member and the fourth four-hinges system.

37. A device according to claim 23, wherein the first and second power-exerting members are arranged on the carrier in the form of rotary motors each having a stator connected to the carrier and a rotor arranged to cause the first and second links, respectively, to pivot, the rotors of the rotary motors are arranged to put, via first transmissions, substantially parallel drive axles into rotation, each of these drive axles is drivingly connected, via a respective angular gear, to one of the first links and a link arm, respectively connected to the second four-hinges system.

38. A device according to claim 37, wherein the drive axles are substantially co-axial to each other and to a pivot axle of the carrier.

39. A device according to claim 37, wherein one of the drive axles extend through the other drive axle, which is designed as a tubular axle.

40. A device according to claim 1, further comprising a transmission arrangement adapted to transmit movement from a rotatable drive member on the first element to a rotable, driven member on the second element, the transmission arrangement comprises transmission members extending along a link assembly comprising one of the first link and one of the second links.

41. A device according to claim 40, wherein the transmission members comprises levers, which comprise two arms and which are rotatably arranged at the hinges of the first and second links relative to each other and the first and second elements about axes parallel to the hinges of the links, said transmission members also comprising pairs of link arms extending between the levers, rotation of one of the levers arranged on the first element by means of the drive member causing rotation of that lever, which forms the driven member and is arranged on the second element, with the assistance of the link arms and an intermediate one of the levers.

42. A device according to claim 41, wherein the transmission members further comprise diverting members rotatably arranged at the hinges of the first and second links relative to each other and to the first and second elements about axes parallel to the hinges of the links, said transmission members also comprising loops of traction-force-transmitting elements laid about said diverting members, one of the diverting members arranged at the first element forming the drive member and one of the diverting members arranged at the other element forming the driven member.

43. A device according to claim 1, comprising two fourth four-hinges systems coupled parallel to each other and each of these systems carry a working member.

44. A device according to claim 43, wherein the two fourth four-hinges system are mechanically coupled to each other for common movement.

45. A device according to claim 1, wherein two sets of first and second four-hinges systems, which are coupled in series, are coupled substantially perpendicularly to each other, each of the sets comprises the first and second elements, the first elements are pivotably connected to a base member about respective pivot axes extending substantially perpendicularly to each other, the pivot axis between the first element in each of the sets and the base member is directed substantially parallel to planes of pivoting of the four-hinges systems in this set, and a carrying arrangement is hingedly connected to both of the second elements about substantially perpendicular axes substantially parallel to the pivot axes between the first elements and the base member.

46. A device according to claim 45, wherein first power-exerting members are arranged on each of the first elements for pivoting one of the first links which are connected to said first element, said first links being included in the respective sets of four-hinges systems, and second power-exerting members are adapted to pivot an arm, to which there is connected a link arm which is pivotably connected to the second four-hinges system.

47. A device according to claim 45, wherein on the base member there are arranged three power-exerting eighth members, which are coupled, via link arms pivotable in non-parallel planes, to the carrying arrangement for positioning the same relative to the base member.

48. A device according to claim 1, further comprising a transmission arrangement for power transmission from a drive member on the first element to a driven member on the second element, the transmission arrangement comprises axles extending substantially parallel to the links in the parallelogram-shaped first and second four-hinges systems, said axles being interconnected by means of one or both of (a) cardan joints and (b) angular gears.

49. A device according to claim 1, wherein the first element is pivotably connected to a base member about a first pivot axis, a ninth power-exerting member is adapted t o pivot the first element and, accordingly, the first and second four-hinges system and the second element about the pivot axis, a carrying arrangement is pivotably connected to the second element about a second pivot axis directed substantially parallel to the first pivot axis, and a tenth power-exerting member is adapted to pivot the carrying arrangement about the second pivot axis.

50. A device according to claim 1, wherein said device is formed by an industrial robot, the second element of which is intended to carry, directly or indirectly via a carrying arrangement, a working member.

* * * * *